United States Patent [19]

Kostelnicek et al.

[11] 3,886,494
[45] May 27, 1975

[54] SYSTEM FOR GATHERING AND RECORDING SEISMIC SIGNALS

[75] Inventors: Richard J. Kostelnicek; Haines C. Hibbard, both of Houston, Tex.

[73] Assignee: Exxon Production Research Company, Houston, Tex.

[22] Filed: Nov. 13, 1972

[21] Appl. No.: 306,096

[52] U.S. Cl........ 340/15.5 TS; 340/15.5 FC; 325/3; 325/13; 325/113
[51] Int. Cl........................... G01v 1/22; H04b 7/14
[58] Field of Search............. 340/15.5 TS, 15.5 FC, 15.5 MC; 325/1, 3, 13, 113; 179/15 BD; 343/6.8 LC

[56] References Cited
UNITED STATES PATENTS

| | | | |
|---|---|---|---|
| 2,700,753 | 1/1955 | Peterson | 340/15.5 TS |
| 2,740,838 | 4/1956 | Pierce | 325/3 |
| 3,283,295 | 11/1966 | Montgomery | 340/15.5 TS |
| 3,294,914 | 12/1966 | Muller | 325/3 |
| 3,541,257 | 11/1970 | McCormick et al. | 343/6.8 LC |
| 3,748,638 | 7/1973 | Montgomery, Jr. | 340/15.5 TS |
| 3,806,864 | 4/1974 | Broding et al. | 340/15.5 TS |

*Primary Examiner*—Maynard R. Wilbur
*Assistant Examiner*—H. A. Birmiel

[57] ABSTRACT

A wireless seismic data acquisition system wherein seismic data detected at a plurality of remote detecting locations is to be transmitted to a remote recording location is disclosed. At a given detecting location, seismic data samples are digitally encoded for radio data transmission to the recording location via a radio frequency relay system comprising data acquisition and relay units located at the various detecting locations. The data samples from the various units located at the detecting locations are injected into the stream of data being relayed by radio to the recording location according to a predetermined program. Units at each detecting location function to relay radio data transmissions from one adjacent location to another, and at the proper time initiate radio data transmissions for relaying thereof. The group of units initiating radio data transmissions is selectable from a larger number of such units by means of a radio signal from a remote control station. Units not within the selected group perform only the relay function.

30 Claims, 21 Drawing Figures

3,886,494

SYSTEM FOR GATHERING AND RECORDING SEISMIC SIGNALS

BACKGROUND OF THE INVENTION

In seismic prospecting it is customary to locate a number of seismic energy detecting means at locations along a traverse at the earth's surface and to locate a number of seismic energy generating means at various locations along the same traverse. Geophones at each of the detecting locations are connected to a common recorder which is usually positioned at a location an appropriate distance away from the generating location to be used. The electrical connection of the geophones to the recorder is usually made by means of pairs of electrical leads which extend between each group of geophones at each detecting location and the recorder. Where the number of detecting locations exceeds the recorder capacity and also for other reasons, a group of geophones can be selectively switched or coupled to the recorder.

After the generation and detection of seismic disturbance, the generating location typically is moved to another generating location. The selection of pairs of electrical leads from the geophones at the various detecting locations relative to the recorder are then appropriately switched or connected to the recorder relative to the preceding connection so that the signals from the various detecting locations are connected to proper recording channels, thus enabling the production of comparable data which can be subsequently processed to produce significant seismograms. As the generating location is successively changed along the traverse and the switching connections depleted, the geophones at one end of the line become unnecessary and typically are transported to the other end of the line to maintain the effective length of the seismic survey and continue the survey process. Operations and apparatus for accomplishing this type of survey are described in U.S. Pat. No. 3,104,568 issued to R. N. Jolly.

Manifestly, a considerable amount of manpower is expended in laying out the electrical leads from the detecting locations to the recording station, albeit the leads are bound into a cable. Furthermore, the use of electrical leads in a cable can result in distortion in the geophone output signals because of the capacitive reactance between the leads and because of the distributed inductive reactance along the length of the wires. In addition, the effect of electrical resistance of the geophone connection farthest from the recorder is greater than nearer geophone connections so that the respective signals are differently affected. With multipair electrical leads, their close proximity and inherent electrical capacitance introduces electrical cross-talk and, if wet, electrical leakage occurs between conductor pairs. An electrical leakage path to ground will also increase the susceptibility of picking up 60 or 120 cycle hum interference. Thus, it is clearly apparent that a practical system which permits elimination of the cable has considerable merit and appeal.

For many years, attempts have been made to eliminate the cable by using radio waves for transmitting seismic information from detecting locations to a recording location. However, these prior attempts have failed or have not been accepted for various reasons which principally include the disadvantage of interference with other radio services and the refusal of government authorities to allocate frequency channels in sufficient number or band width to permit radio transmission of seismic signals. Also, the power requirements for such signals can vary from 1 to 5 watts per channel and such systems are not practical from the standpoint of simplicity of the field equipment requirement.

SUMMARY OF THE INVENTION

This invention contemplates the use of wireless data gathering units (herein sometimes referred to as "geo-links") at remote spaced-apart seismic detecting locations. The geo-links perform the functions of (1) relaying radio data transmissions from one geo-link to another geo-link and (2) generating at selected time intervals a radio data signal which is representative of seismic signals detected at the particular location in question to be relayed from unit-to-unit. Furthermore, the geo-link units preferably are directional with respect to transmission and reception between adjacent units. A particular group of geo-link units (for example, from one to 100 units) are selected from a remote control station via a radio command signal. All remaining geo-links between the active group of geo-links and the recording station not in the selected group simply relay data. Upon the generation of a seismic impulse by any of the available and well-known techniques, each geo-link unit in the selected group has electrical analog seismic signals input to it as in a conventional operation and produces a digital data radio signal representative thereof. Each geo-link unit within the selected group injects its radio data signals into the relay system in accordance with a sequence that preferably begins with the most remote unit and ends with the unit closest to the recording station. This sequence forms a scan of the selected units and repeats at a repetition rate of between 100 and 5000 scans per second.

In a preferred aspect of the invention, the analog seismic signals are converted to binary coded signals which in turn are converted into quaternary coded form comprising four distinctive signals and an additional signal when two successive ones of the four distinctive signals are of the same value. These signals control the frequency of the radio transmitter so that each of the five signals shifts the transmitter to a frequency different from the frequencies produced by the other four signals.

According to another aspect of the invention, electrical analog signals representative of seismic data at the detecting location are repetitively sampled, and each sample is converted to binary coded form comprising pulses on a plurality of channels, which pulses are applied through a selector means to a radio transmitter for controlling the frequency thereof. The geo-link unit at the given detecting location responds to and is synchronized by a timing signal transmitted to it from another location so that the radio transmitter is actuated by the pulses only during particular time intervals that are uniformly spaced apart in time. A radio receiver in the geo-link unit detects coded transmissions from an adjacent location, converts the received signals into a time series of coded pulses, and applies the pulses through the selector unit to the radio transmitter for controlling the frequency thereof. The selector unit functions to apply the coded pulses representative of the sampled data to the radio transmitter during each said particular interval, and to apply to the transmitter pulses representative of signals received from the adjacent location during times between such intervals.

According to still another aspect of the invention a radio signal which is shifted among a plurality of frequencies and is representative of coded seismic data is detected and converted to a series of electrical time pulses representative of the data. Each time pulse corresponding to a frequency shift of the received radio data transmission is delayed by an interval at least equal to its time duration. The delayed pulses actuate a radio transmitter such that each pulse produces a frequency shift representative of the frequency shift previously received and delayed by the unit.

Viewed in another manner the invention relates to seismic surveying wherein seismic energy is generated for producing seismic impulses at a plurality of receiving locations along the traverse and electrical signals are generated at each of the receiving locations as a function of the seismic impulses. The electrical signals are sampled and distinctively coded so that signals representative of the values of the sampled signals are generated. Discrete radio transmissions indicative of said coded signals are originated in a sequence from a selected number of said plurality of locations. Each discrete transmission is received and retransmitted at each successive location in the selected number of locations. The steps of sampling the electrical signals and originating the radio transmissions are repeated a plurality of times so that during each sequence of such steps a signal indicative of a different time sample is transmitted.

Other objects and features of the present invention which are not apparent from the foregoing discussion will become evident upon consideration of the following detailed description of the invention when taken in connection with the accompanying drawings.

DETAILED DESCRIPTION OF AN EMBODIMENT OF THE INVENTION

Figure 1:
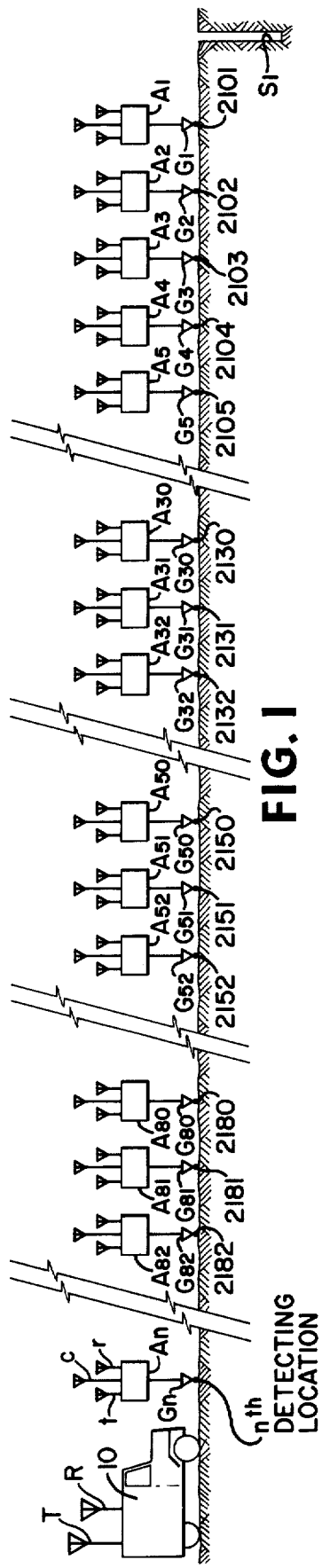
FIG. 1 is an illustration in simplified block form of a seismic layout employing the present invention over a traverse of the earth's surface.

In the present invention, at each seismic detecting location there is a self-contained transmitter, receiver, and data processor, or geo-link unit. Seismic data input to a remote geo-link unit is sampled, digitized, and transmitted to an adjacent geo-link unit where it is received and retransmitted to the next adjacent unit and so forth. Thus, seismic data from a given remote unit is relayed from unit to unit by radio transmission. Each unit has the capability (1) to sample and process seismic signals produced at that location, (2) to encode these signals, and (3) to introduce the encoded data signals into the radio transmission relay system. As shown in FIG. 1, a recording station and a master control station which provides a command and timing control radio signal are located in a movable truck 10. If desired the master control station apparatus may be at a different location from the recording station. The truck 10 is illustrated as located to the left of the n-th detecting location but can be located to the left or right of the active group of geo-link units. The truck 10 has an antenna T for transmitting the command and timing radio signals to all geo-links and is preferably in the 100—200 megahertz band. Also at the truck is an antenna R for receiving the relayed radio signals from the geo-link units and is preferably in the 500–1000 megahertz band.

A typical geo-link unit $An$ is illustrated in FIG. 1 at a detecting location to the left of the seismic energy generating location or shot hole S1. All of the geo-link units are constructed identical in principle to the unit $An$ so that a description and explanation of this unit will suffice for all of the other units. Each geo-link unit, as illustrated by unit $An$, has a data transmitter antenna $t$, a data receiver antenna $r$ and a command and timing receiving antenna $c$. At each of the detecting locations 2101–2182 there is a corresponding geo-link unit identified by the designations A1, A2, A3 . . . A82. Each geophone unit is shown connected to a seismic detector or geophone designated by the reference characters G1, G2, . . . Gn. Manifestly a plurality of geophones can be used at each detecting location and connected in series, parallel or series-parallel in a manner well known to the art.

Figure 2:
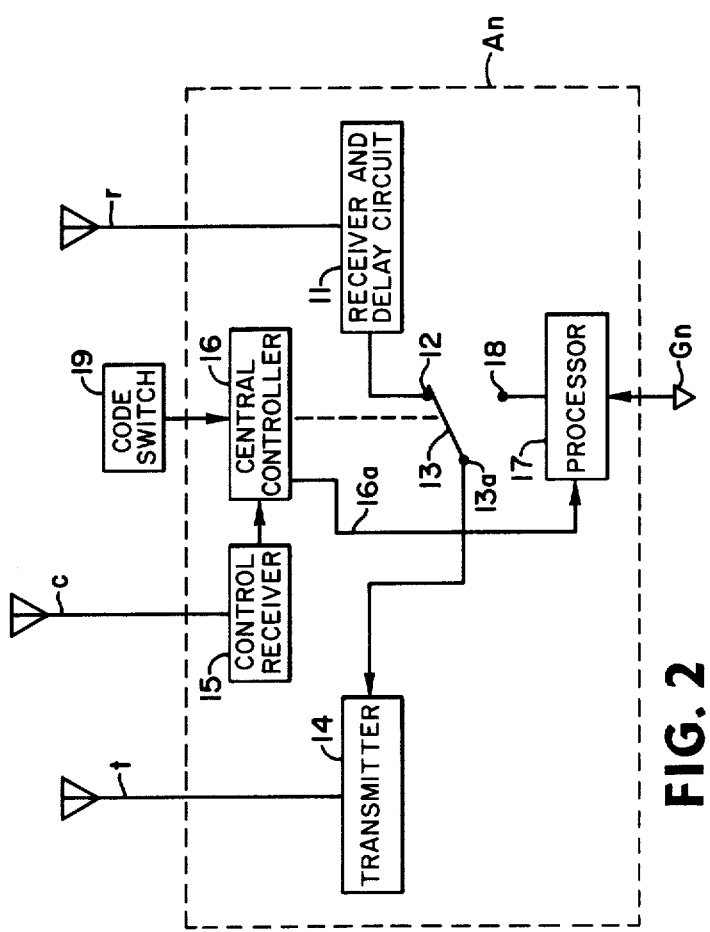
FIG. 2 is a block diagram of a component unit (geo-link) of the present invention which is at each seismic detecting location.

The typical geo-link unit $An$ is illustrated in block diagram form in FIG. 2. The unit has a receiving antenna $r$ coupled to a receiver and delay circuit 11 which inputs received data signals to a selector input terminal means 12. The selector means 13 is schematically illustrated for explanation purposes as a two-position switch. In the position shown, the output terminal means of selector 13 conveys the data signals, as received and delayed by circuit 11, to a transmitter circuit 14 which outputs the data signals to the transmitter antenna t. In the selector position illustrated, the unit relays data signals. In the other position of selector 13, seismic data from processor 17 is conveyed to transmitter 14. The position of selector 13 is controlled by controller circuit 16. A control receiver 15 which is coupled to the antenna c introduces command and timing signals to controller 16 in order to establish the period of actuation of selector 13 and to provide timing and control signals via lines 16a for controlling the operation of processor 17.

Initially, the controller circuit 16 is preset by a manual code input switch 19 which permits each unit to be electronically distinguished from the other geo-links. The controller circuit 16 selects and sequences the group of geo-links which have code numbers input by code switches 19 lying in a desired range. This range is determined in accordance with the command signal received by control receiver 15. In accordance with the timing signal the controller circuit 16 operates the selection means 13, thereby processor circuitry 17 via selection input 18 to the transmitter circuit 14. At the same time the receiver 11 is disconnected from the transmitter 14 by the selector means 13. Under the control of signals on lines 16a, the processor 17 receives an analog seismic signal from the geophone means Gn, samples the seismic signal and encodes the sampled analog signal into a digitally coded signal for transmission purposes. It thus can be appreciated that each unit acts as a radio transmission relay and, at selected times, interjects its collected data signal into the radio relay system.

Figure 3:
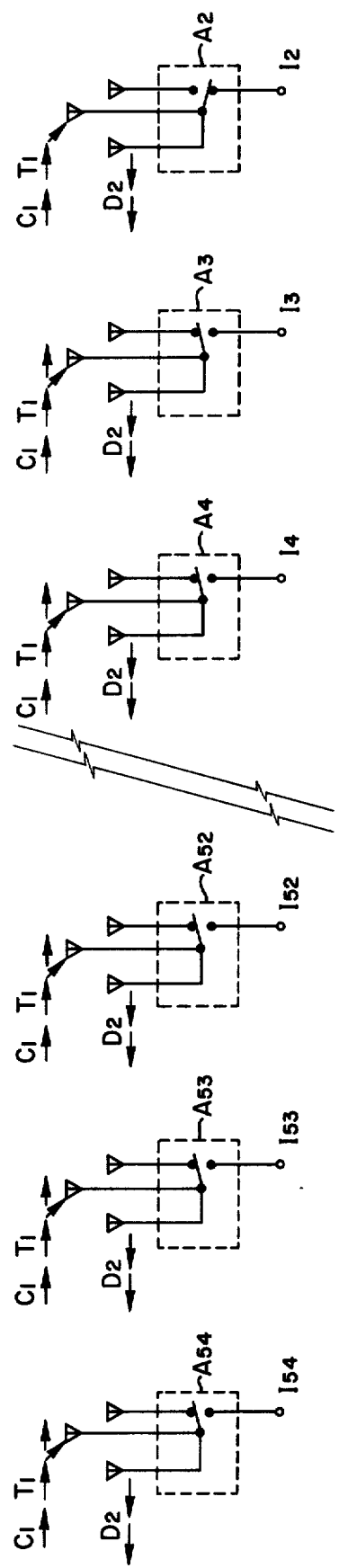
FIG. 3 is a functional illustration for understanding the operation of a group of geo-link units.

The fundamentals for operation of the system of this invention can best be understood by reference to FIG. 3. In FIG. 3, there are shown spaced-apart geo-link units A2, A3, A4 . . . A52, A53, and A54 which are functionally illustrated. The units respectively continuously receive analog electrical input geophone data signals. From the control station (not shown), a timing signal T1 and a command signal C1 are issued to each of the geo-link units. Each of the geo-link units is preset by a manual code switch 19 (see FIG. 2) so that the command signal C1 selects the proper group of geo-link units, while timing signal T1 sequences the selected units to sample in a repetitive manner. As mentioned heretofore and as will be apparent from the discussion to follow, selection and sequencing of from one to 100 geo-link units as a group is a practical variant. For the purpose of clarity of description, a system based on 50 units as a group will be disclosed.

Figure 4:
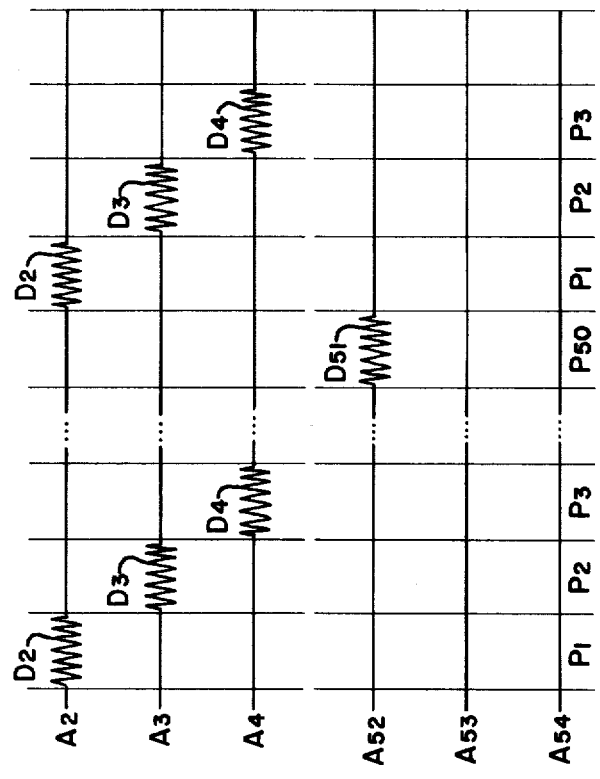
FIG. 4 is a timing diagram for use in understanding the explanation relative to FIG. 3.

Refer to FIGS. 3 and 4 together. The geophone data signal I2 supplied by processor 17 (see FIG. 2) is coupled to a transmitter 14 during the period P1. This transmitted data signal is then relayed from unit to unit as a coded data radio transmission D2 and is finally received and recorded at truck 10. The relaying action occurs because all of the other selector means are in the relay position thereof during the period P1. During the time period P2 the geophone data signal I3 in the form of coded radio transmission from unit A3 to unit A4 and thereafter relayed from unit to unit until the data signal reaches truck 10. During the time period P2, the selector means in unit A2 returns to its normal relay condition. The sequence of timing for transmission of data signals continues until the 50th time period P50, when the radio data transmission D51 is transmitted from unit A51. After the time period P50, the timing cycle repeats. The units A52, A53, and A54 which are not in the selected group of 50 units are unaffected by the timing sequence and serve only to relay data radio transmissions between unit A51 and truck 10.

To select another group of 50 units, another and different command signal C1 is transmitted from the control station to each of the geo-link units. The new command signal C1 together with timing signal T1 will appropriately change the period during which selector means 13 is actuated in each unit of the selected group. The command signal shifts the responsive group of 50 units so that the group now comprises units A3 through A52. Furthermore, A3 is now the first unit and A52 is now the last unit to respond in the sequence of 50 time periods P1-P50. Further detail on the apparatus for selecting and sequencing the responsive group of 50 units will be provided hereinafter with reference to FIG. 8.

Figure 5:
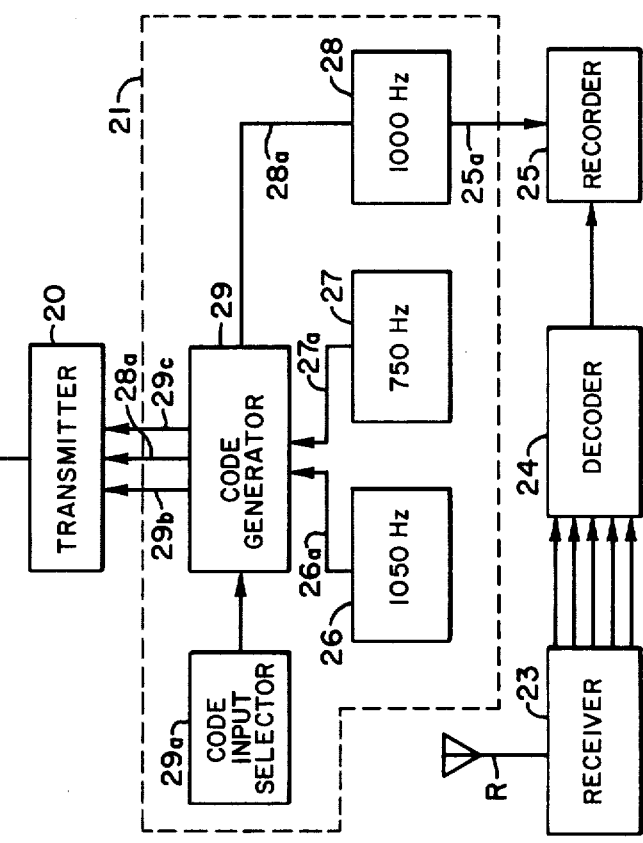
FIG. 5 is a block diagram of the control and recording station components for the present invention.

Referring now to FIG. 5, a control station comprised of command transmitter 20 and master timing and control unit 21 is illustrated. Also illustrated is the recording station comprised of data receiver 23, decoder 24 and recorder 25. For explanatory purposes it is assumed that the control station and recording station are both at the location of truck 10. However, as mentioned above they may be at separate locations.

Date relayed from the active group of geo-link units is supplied to receiver 23 via antenna R. This receiver performs a receiving function similar to that which will be described hereinafter with respect to an individual geo-link unit. The output signals of receiver 23 appears on five lines, as illustrated, and is decoded by decoder circuit 24 (described hereinafter with reference to FIG. 20) and supplied to data recorder 25. With respect to recording, there are, of course, entirely feasible alternatives such as furnishing the data to a computer or display device in a well-known manner.

One function of the master timing and control unit 21 is to initiate a seismic disturbance by radio transmission from a shot break radio transmitter (not shown). The time of occurrence of such a disturbance can be provided by a shot break indicator (not shown) which can be coupled to the recorder 25.

Another function of the master timing and control unit 21 is to transmit timing signals T1 and command signals C1 to all of the geo-link units, as shown in FIG. 3. The timing and command signals either frequency, phase, or amplitude modulate a radio frequency transmitter 20 operating at a carrier frequency of typically 158 MHz. The frequency of 158 MHz is cited for illustration purposes only as it lies in the frequency band of 100 to 200 MHz mentioned above. The timing signal T1 is generated by the 1000 Hz signal source 28 and supplied to transmitter 20 on line 28a for modulation thereof. The timing signal T1 may also be supplied to the recorder 25 on line 25a for the purpose of synchronization. The code generator 29 produces the command signal C1 which is composed of a 1050 Hz pilot signal supplied to code generator 29 on line 26a by signal generator 26 and a 750 Hz update signal supplied to code generator 29 on line 27a. The 750 Hz signal supplied by signal generator 27 is keyed on and off in accordance with a stream of serial binary coded decimal pulses representative of an update number supplied by code input selector 29a. As mentioned above the command signal C1 is used to select and sequence an active group of geo-link units. It will be appreciated that the phase relationship and thereby frequency stability and accuracy of the signal generators 26–28 will have a common basis when all are derived from a common signal source (not shown). Suitable apparatus for use in transmitter 20 simultaneously modulating transmitter 20 by three low frequency signals is well known to the art and will not be described herein.

The details of code generator 29 and code input selector 29a will hereinafter be described with reference to FIG. 21. The effective use of the command signal C1 by the geo-link units will hereinafter be described with reference to FIG. 7.

Figure 6:
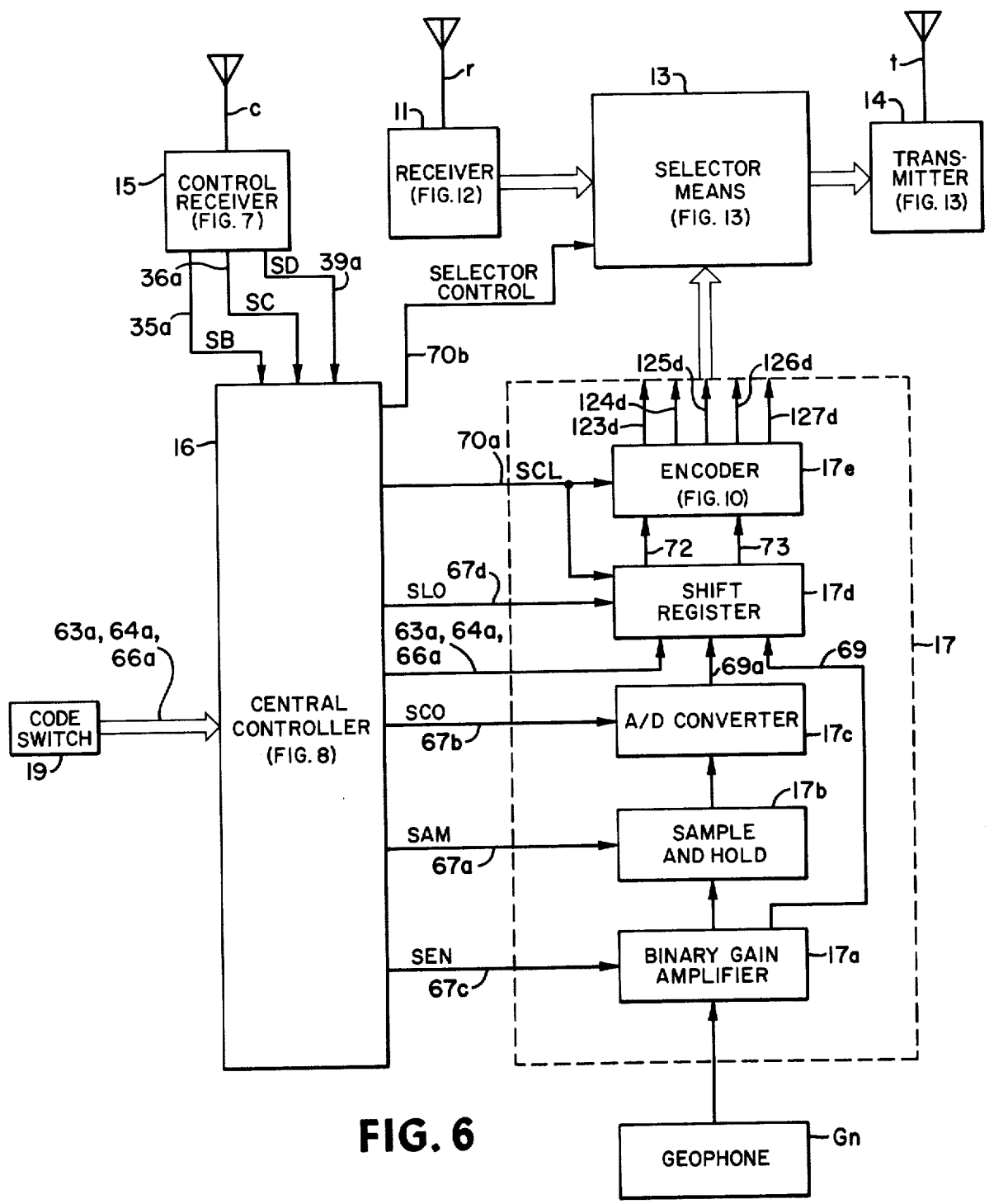
FIG. 6 is a block diagram in further detail of the component unit (geo-link) disclosed in FIG. 2.

The electrical arrangements for the geo-link unit An of FIG. 2 are illustrated in block diagram form in FIG. 6 where similar components are identified by similar reference numerals. The details of the processing unit 17 are set forth in FIG. 6 and are hereinafter described with reference to that FIGURE. The details and ensuing description of the other functional units of FIG. 6 are hereinafter set forth with regard to the FIGURES as follows: the control receiver with reference to FIG. 7, the central controller 16 and the manual code input switch 19 with reference to FIG. 8, the data receiver 11 with reference to FIG. 12, and the selector means 13 and data transmitter 14 with reference to FIG. 13.

Referring now to FIG. 6 the processing unit 17 comprises a binary gain amplifier 17a for receiving signals from a geophone Gn and transmitting them, after suitable amplification, to a sample-and-hold circuit 17b. The binary gain amplifier 17a may be any of several types known to the art which, in addition to the amplified output signal, also produce signals indicative of the gain of the amplifier. The signals from the sample-and-hold circuit 17b are applied to an analog-to-digital converter 17c where they are converted to binary digital form for application to shift register 17d. Simultaneously with the storing of a binary number signal from the A/D converter 17c in the shift register 17d, a binary indication of the concomitant gain of amplifier 17a is also stored in the shift register via line or lines 69. The output from the shift register is applied to an encoder 17e on lines 72 and 73. The encoder 17e produces output signals on lines 123d–127d as will be described hereinafter with respect to FIGS. 10 and 11. As will be further described hereinafter the sequence of operation of the various components of processor 17 is controlled by central controller 16 by signal lines 67c, 67a, 67b (respectively connected to binary gain amplifier 17a, sample-and-hold circuit 17b and A/D converter 17c) lines 63a, 64a, 66a and 67d (connected to shift register 17d) and line 17a (connected to encoder 17e). Central controller 16 also controls operation of selector means 13 through line 70b. The central controller receives control signals from code switch 19 on lines 63a, 64a, and 66a and from control receiver 15 on lines 35a, 36a, and 39a. The signals from the encoder 17e are applied to the selector means hereinafter described with respect to FIG. 13.

Figure 7:
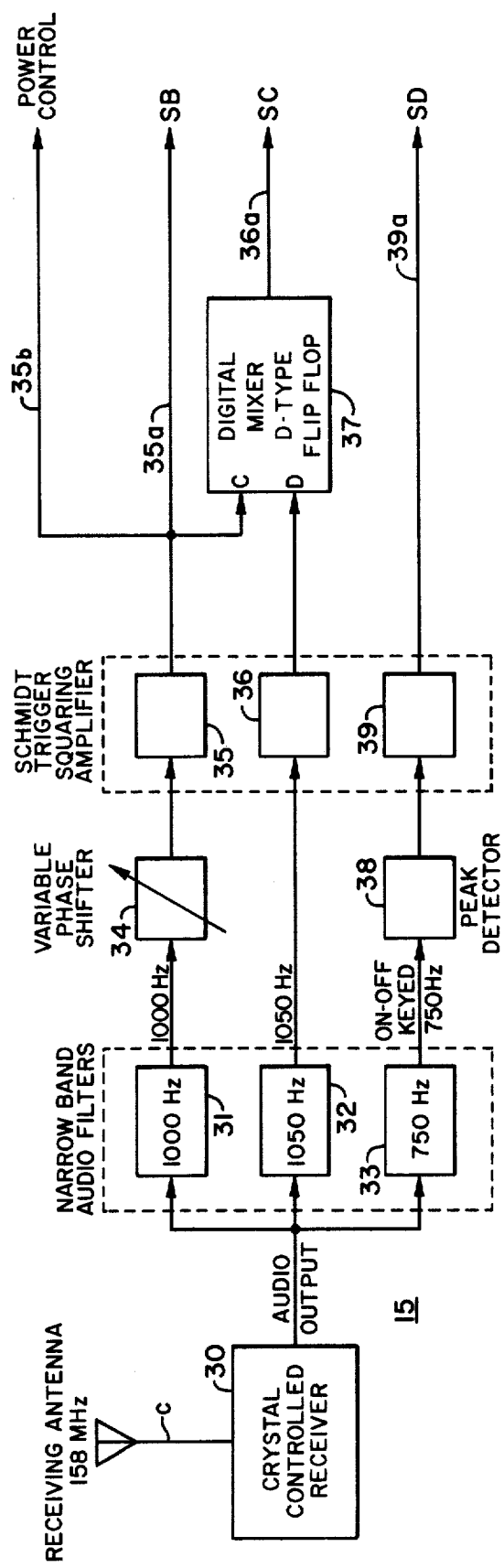
FIG. 7 is a block diagram in further detail of the control receiver disclosed in FIG. 6.

Referring now to FIG. 7, the control receiver 15 receives the 158 MHz timing and control signals which are transmitted from the control station located at truck 10. The 158 MHz signal is a carrier which is modulated simultaneously by the 1000 Hz timing signal T1 and the command signal C1 by the apparatus illustrated in FIG. 5. As stated previously, the command signal C1 is composed of the 1050 Hz signal and the on-off keyed 750 Hz signal. A crystal control receiver 30 receives and demodulates the command and timing signals. The demodulated signals are simultaneously supplied to narrow band audio filters 31–33 which respectively pass the 1000 Hz, 1050 Hz, and 750 Hz variable phase shifter 34 and then to Schmidt trigger squaring amplifier 35 which produces (via an output lead 35a) a square pulse output (hereinafter identified or referred to as "SB") at a frequency of 1000 Hz. The variable phase shifter 34 is used for calibration purposes so that output signal "SB" of all units can be adjusted to a common in-phase timing base prior to use in the field. Aside from being used for timing purposes the 1000 Hz "SB" signal may also be used to actuate circuits (not shown) via lead 35b for applying power to the electrical components in the remaining portion of each geo-link unit. It will be appreciated that the geo-link units except for the command receiver portions thereof are powered-off in the absence of timing signal T1, to conserve the input battery power.

The 1050 Hz pilot signal and the keyed on-off 750 Hz signal passed by filters 32 and 33 respectively are provided in order to enter a new command signal to the geo-link unit for the purpose of selecting and synchronizing a group of such units. The 1050 Hz pilot signal is supplied to Schmidt trigger squaring amplifier 36 from narrow band filter 32. The 1050 Hz output of squaring amplifier 36 and the 1000 cycle "SB" signal are supplied to the "D" and "C" inputs respectively of digital mixer 37 (a D-type flip-flop). The output of digital mixer 37 is a 50 Hz square pulse hereinafter referred to as the "SC" signal appearing on line 36a. The keyed on-off 750 Hz signal from narrow band filter 33 is supplied to peak detector 38. Peak detector 38 has an electrical output signal representative of the amplitude envelope of the on-off keyed 750 Hz signal. The output of peak detector 38 is supplied to Schmidt trigger squaring amplifier 39. The output of squaring amplifier 39 comprises electrical pulses representative of a serial stream of binary coded digits (a "1" digit is representative of the keyed-on 750 Hz signal and a "0" digit is representative of the absence of or keyed-off 750 Hz signal) and will be hereinafter referred to as "SD" or update signal which appears on lead 39a.

In effect, control receiver 15 receives and demodulates the timing and command signals transmitted from the control station illustrated in FIG. 5. The outputs of control receiver 15 (FIG. 7) are representative of (1) the timing signal "SB" which will be used to synchronize all of the geo-link units in the activated group, (2) the "SC" clocking signal together with the "SD" update number signal which are supplied to controller 16 and will be used to select and sequence the proper group of geo-link units.

Figure 8:
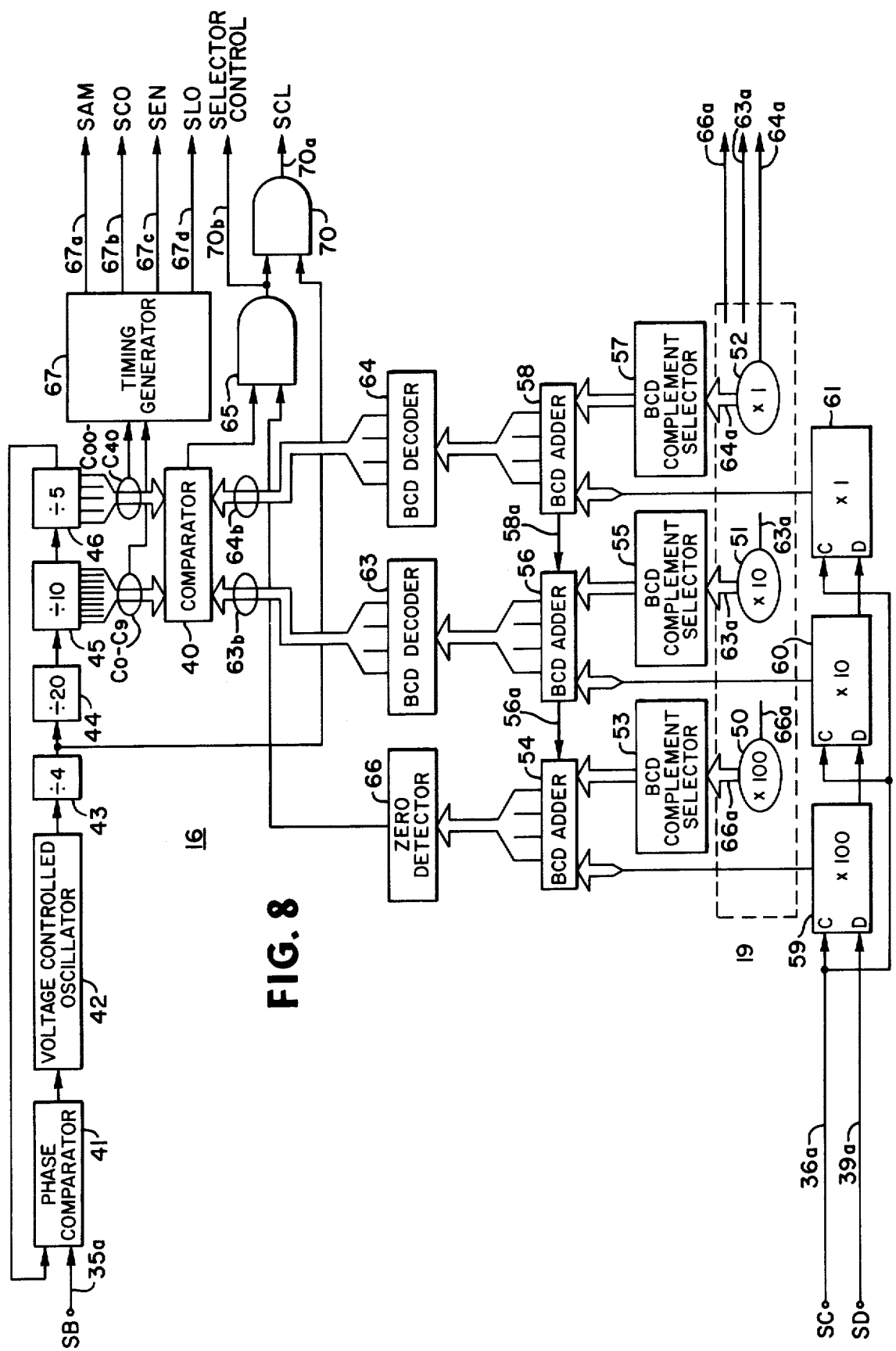
FIG. 8 is a block diagram in further detail of the central controller disclosed in FIG. 6.

Referring now to FIG. 8, there is illustrated in block diagram form the central controller 16 disclosed in FIG. 6. One function of the central controller is to process the "SB" update number together with the location number input by manual code switch 19 in order to determine (1) if the unit in question is within the group of 50 geo-links selected for data acquisition and, thereby, whether the unit performs both the relay and data gathering functions or simply the relaying function and (2) if the unit is in the selected group of 50 geo-links, to determine the period Pn during which it injects its acquired data dignals into the relay system. Another function of the central controller is to supervise the operation of the processor 17 which generates encoded digital data signals to be transmitted into the relay system from the sampled seismic signals generated at the detecting location in question. The time occurrence of the various processor functions to be hereinafter described and the period of actuation of the selector means 13 are coordinated by and synchronized to the "SB" timing signal.

Timing signal "SB" which is at a frequency of 1000 Hz is the reference signal for a phase locked loop consisting of phase comparator 41, voltage controlled oscillator 42, and divider circuits 43, 44, 45, and 46. The timing signal "SB" is applied via lead 35a to phase compaator circuit 41 the output of which is applied to a voltage controlled oscillator 42 hereinafter referred to as VCO. The VCO 42 has an output frequency of 4 MHz which is supplied to a first divider circuit 43 which divides the input by a factor of 4 thereby producing a 1 MHz signal, and supplies this signal to a second divider circuit 44 which divides the signal by a factor of 20 thereby producing a 50 kHz signal. The output from the second divider circuit 44 is applied to a third divider circuit 45 which divides the signal by a factor of 10, thereby producing a 5 kHz signal. The output signal from divider 45 is supplied to a fourth divider circuit 46 which divides the signal by a factor of 5, thereby producing a 1000 Hz signal. Divider circuit 46 then applies the 1000 Hz signal to the phase comparator 41. Thus, the phase comparator output is used to synchronize the 4 MHz VCO output to the 1000 Hz input timing signal "SB" in a phase locked loop by use of a phase comparator, VCO, and divider chain in a manner well known to the art.

Figure 9:
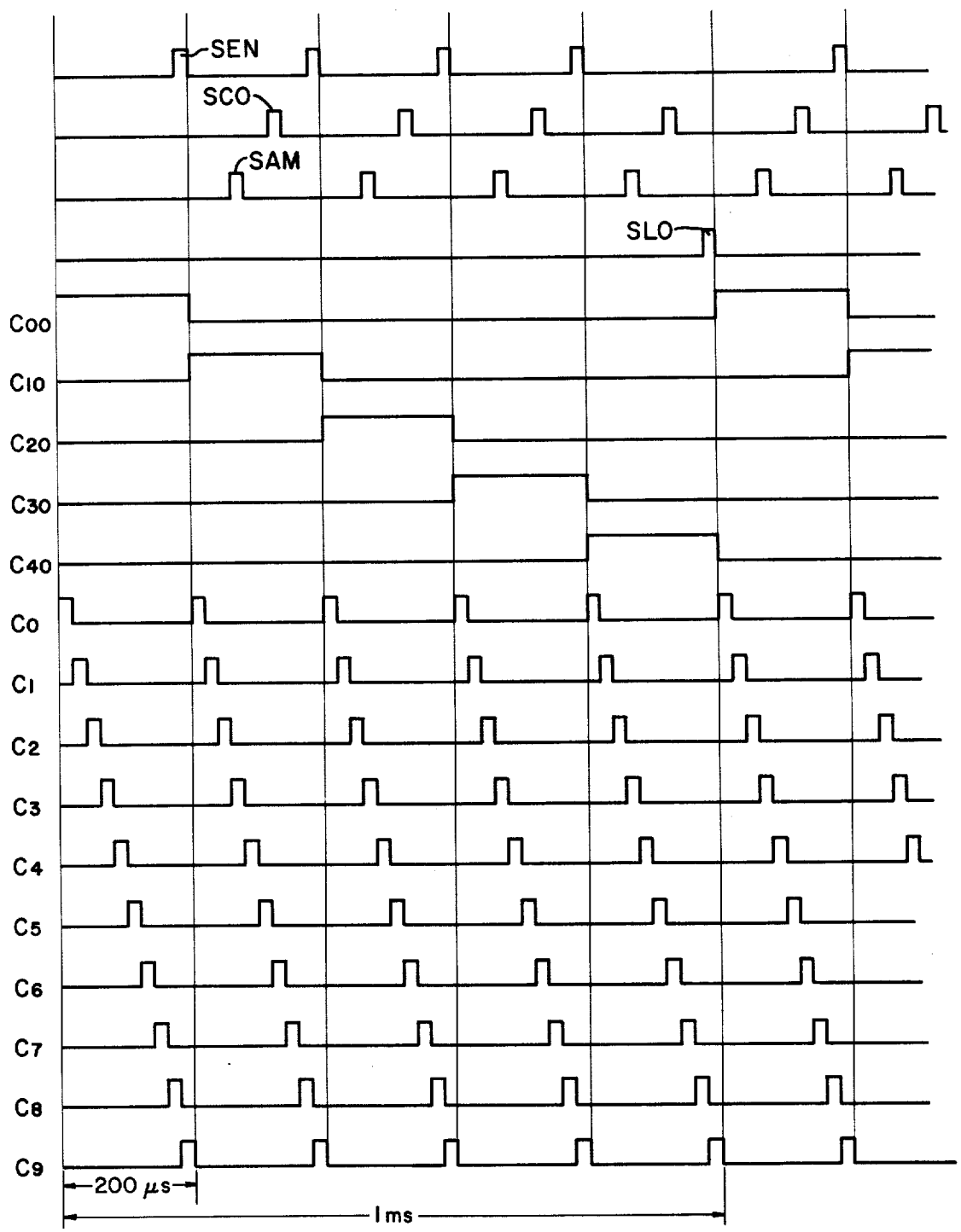
FIG. 9 is a timing diagram for use in understanding the explanation relative to FIG. 8.

The third divider circuit 45 is arranged to produce a sequence of 10 pulses which are repetitive appearing on lines "C0"-"C9" as illustrated in FIG. 9. The fourth divider circuit 46 is arranged to produce a sequence of pulses which are repetitive appearing on connections "C00"-"C40" also illustrated in FIG. 9. As will be appreciated from FIG. 9, the 15 pulse signals on lines "C0"-"C9" and "C00"-"C40" when taken together provide 50 sequential and distinct pulses corresponding to the 50 sequential time periods P1-P50 which are also repetitive in sequence. For the example given, each of the 50 time periods occurs for 20 microseconds and a scan of 50 signals takes but 1 millisecond.

It will be recalled with respect to the discussion relative to FIG. 2 and the unit An that there is a coding circuit 16 which provides a distinctive coding for each unit. To accomplish this, each unit is provided with three binary coded decimal (BCD) generating switches 50-52 (comprising code switch 19) which are manually controllable. For the particular embodiment illustrated, the switch converts a decimal 0-9 number to a correspondingly related four bit binary coded number. The purpose of the manual switches on each unit is to enable each unit to be distinguishable in timed sequence from the other with respect to a common input command control signal C1 from the control station.

As illustrated in FIG. 8, there is a selector switch 50 for the 100's units, a selector switch 51 for the 10's units and a selector switch 52 for decimal digits between 0 and 9. The switches 50-52 are arranged to be set by decimal digits but reflect or output correspondingly binary coded number in the electrical circuitry.

As an example of coding purposes, a geo-link unit such as A2 of FIG. 1 could have its switch 51 set at decimal "1," its switch 52 set at decimal "0" and its switch 53 set at decimal "2," thus inputing the decimal number "102" to the unit A2. An adjacent unit A3 toward the recording truck 10 would be programmed by one higher digit (switch 53 set at decimal "3") to input the number "103" and the next adjacent unit A4 (switch 53 set at "4") would input the number "104" and so forth.

The switch 50 inputs to a binary coded decimal or BCD complementing selector 53. For purposes of the present example, the selector 53 is inactive and inputs the uncomplemented BCD number from switch 50 to a BCD digital adder 54. The switch 51 similarly inputs its BCD number to a complementing selector 55 which supplies the uncomplemented BCD number from switch 51 to the digital adder 56. The switch 52 inputs its BCD number to the complement selector 57 which inputs the uncomplemented BCD number from switch 52 to the BCD digital adder 58. Adders 54, 56, and 58 thus each have one preset BCD numerical addend as determined by the numerical settings of switches 50-52. Adder 58 has its last stage connected to the adder 56 and adder 56 has its last stage connected to the adder 54. Thus if the input to the adder 58 cumulated more than a numerical value of 9, a carry-over signal is applied via line 58a to increment the value in adder 56. The adder 56 similarly provides a carry-over input via line 56a to the adder 54.

Three digital shift registers comprised of register stages 59-61 convert serial BCD input pulses to a parallel output signal representative of a coded up-date number "SD." The "SC" signal clocks or shifts the "SD" signal (FIG. 7) which is input as a serial BCD number into the registers 59-61 of all geo-link units. The "SD" signal is then output as a parallel BCD number which is applied to the adders 54, 56 and 58.

In this process, each cycle of the 50 Hz signal "SC" represents a bit period, and the presence or absence of a 750 Hz signal during a bit period produces the signal "SD" which indicates a "0" or "1" digit. The 50 Hz signal "SC" supplied via line 36a is applied to each of the shift inputs "C" of registers 59-61 while the serial BCD signal "SD" is supplied via the data line 39a to the "D" input of the register 59. Register 59 is coupled to the "D" input of register 60 and register 60 is connected to the "D" input of register 61. As illustrated, the 100's shift register 59 is coupled to the adder 54, and 10's shift register 60 is coupled to the adder 56 and the shift register 61 is coupled to the adder 58. The adder circuits 56 and 58 are respectively coupled to BCD decoder circuits 63 and 64, while the adder circuit 54 is coupled to a zero detector circuit 66. In the example where the units A2-A52 are sequentially programmed with decimal numbers 102-152, respectively, a noncomplement number is selected as outputs from selectors 53, 55 and 57. To select and sequence the units A2-A52 to respond as a group of 50 units, the code generator 29 (FIG. 5) in the truck 10 is set to send out a combined 1050 and 750 Hz signal in serial binary coded decimal format on 158 MHz transmission where the BCD format signal is equal to an update number "899." The number "899" when input to the shift registers 59-61 of the unit A2 will produce a parallel BCD output signal representative of the number "899" with the BCD coding for the last "9" being supplied to the adder 58, the binary coding for the middle "9" being supplied to the adder 56 and the binary coding "8" being supplied to the adder 54. At the same time the switches 50-52 respectively supply to the adders 54, 56, and 58 a noncomplemented BCD coding for the number "102." In the adders 54, 56, and 58, the sum of "899" and "102" would be "1001." Since the three adders select only units, tens, and hundreds positions, the leading "1" is ignored. The "001" value in the adders 54, 56, and 58 is respectively input to the zero detector circuit 66 and BCD decoders 63 and 64. The purpose and function of the BCD decoders 63 and 64 is to provide a selector signal to the comparator 40 via lead groups 63b and 64b. This selector signal in unit A2 selects the first in the sequence of repetitive timing signals corresponding to time period P1 of the sequence of reference input signals.

The adjacent unit A3 has input from selectors 53-57 the number "103" to the adders 54, 56, 58 and the addition of the update number "899" gives the sum of "1002." The resultant input to the comparator 40 selects the second in the sequence of timing signals which corresponds to the second timing period P2 of the sequence of reference input signals to the comparator. It will therefore be seen that the transmission of the number "899" selects units A2 through A51 for operation. The number "898" would select units A3 through A52 for operation.

Before proceeding with the description it may be explained that in the foregoing case the numbers presented into the units increase in the direction toward the truck. Should the truck be to the opposite side of the units, i.e. unit A2 to closest to the truck, then the complement selectors 53, 55, and 57 of the units 16 are respectively activated. Thus, unit A52 with an input number of "152" from switches 50-52 would be complemented by selectors 53, 55, and 57 to a value of "948," and unit A51 would have a complemented number of "949," and so forth in a direction toward the truck. By the transmitted command signal of "103" then the selection of timing signals will sequentially operate the units from the farthest unit A52 towards the nearest unit A2.

The respective outputs of dividers 45 and 56 are also individually supplied to a timing generator 67. In the generator 67 the pulse input signals are combined to provide control output signals as follows: (1) a repetitive sample-and-hold output pulse "SAM" via a conductor 67a (see FIG. 9), (2) a repetitive convert pulse "SCO" for A/D converter 17c via a conductor 67b, (3) an enable pulse "SEN" for binary gain amplifier 17a via a conductor 67c and (4) and a load pulse "SLO" for shift register 17d via a conductor 67d. The sequence of these pulses is in the order described and as illustrated in FIG. 9. During each scan interval these pulses operate the timing of the components in processor circuit 17 (see FIG. 6).

Referring back to FIG. 6, at the time of the "SEN" pulse, the binary gain amplifier 17a is enabled. At the time of the sample pulse "SAM," the sample-and-hold circuit 17b samples the potential of the binary gain amplifier and holds the value. The next occurring convert pulse "SCO" actuates the A/D converter 17c to convert the analog signal into a 16-bit binary word including a sign. Register 17d is a 32-bit parallel input-serial output shift register and, in addition to the output of the A/D converter 17c on leads 69a, also receives the station coding number from switches 50-51 (via conductors 63a, 64a, 66a) and the gain setting of the binary operated gain amplifier 17a via a connection 69. Upon the occurrence of the load signal "SLO," all of the foregoing data is loaded into the register 17d. The occurrence of the shift signal "SCL" operates the register 17d to serially transfer the data to the encoder 17e. The shift signal "SCL" is produced as an output on lead 70a (FIG. 8) by an AND circuit 70 which responds to the output of a signal input from divider 43 and a signal from an AND circuit 65. Upon the occurrence of the shift signal "SCL," the first 16 digits from the register 17d are supplied via an output lead 72 to the encoder 17e and the second 16 digits from the register 17d are simultaneously supplied via an output lead 73 to the encoder 17e. The AND circuit 65 is input from the comparator 40 and from the zero detector circuit 66 so that coincident signals are required for operation of the shift clock. This effectively prevents selecting groups of 50 units other than those desired. The output of AND circuit 65 also operates selector means 13 of FIG. 6 via lead 70b.

Figure 10:
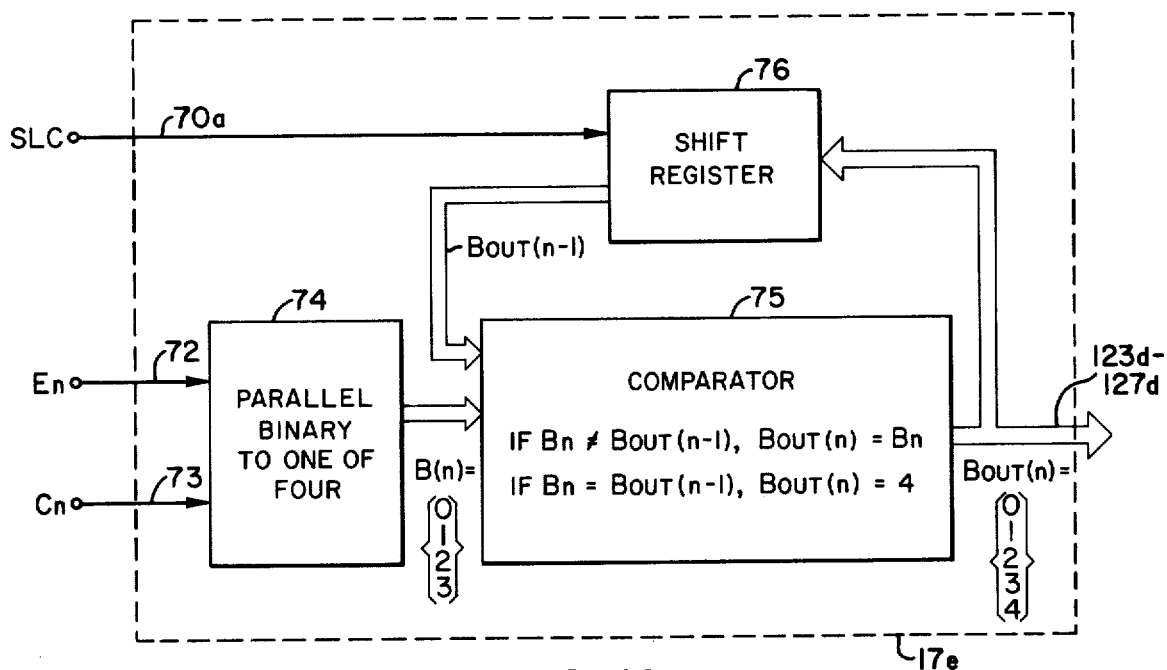
FIG. 10 is a block diagram of the encoder disclosed in FIG. 6.

Before proceeding with our explanation of the encoder 17e (an embodiment of which is shown in FIG. 10 and in more detail in FIG. 14) it should be noted that the present invention utilizes what may be termed an extended quaternary coding system. This is desirable in order to reduce the time required for transmission of data. The coding is accomplished by parallel combining of outputs to form a distinct coding mode. In the present system the 32 binary bits (a "0" or "1" digital value) are serially arranged to contain the necessary information from one geo-link A$n$. The first 16 bits are combined with the last 16 bits for transmission. When the combinations available are considered two bits at a time, there can be a 0-0, 0-1, 1-0, or 1-1 combination. By use of a quaternary encoding principle, four distinct signals can be used to represent the four possible combinations. Because two or more sequential signals can be alike, a fifth distinct signal is employed to distinguish between the occurrence of any two like pair signal combinations.

Referring now to FIG. 10, an overview of the encoder 17e is illustrated. The first 16 bits of a 32-bit sequence "En" from shift register 17d are input on lead 72 to an encoder 74 while the last 16 bits of a 32-bit sequence "Cn" are input on lead 73. In response to the parallel input of the n-th pair of 16 binary digits, the encoder 74 produces an output B$n$ on four lines to comparator 74 having a value of 0, 1, 2, or 3 dependent upon the parallel digit combinations. The B$n$ output value provides an output signal Bout($n$) which is equal to B$n$ if the preceding digit signal Bout($n-1$) was not the same. [The signal Bout($n-1$) is derived from the output of comparator 75 after having been delayed one clock interval in shift register 76.] If the preceding digit signal Bout($n-1$) is the same as the digit signal for B$n$, an output signal of 4 is produced or in the event of a signal of 4 for the digit signal Bout($n-1$), the output is equal to the signal of the B$n$. An example of a typical input-/output sequence is as follows:

TABLE I

| Bit Pair No. | 1 | 2 | 3 | 4 | 5 | 6 | 7 | 8 | 9 | 10 | 11 | 12 |
|---|---|---|---|---|---|---|---|---|---|---|---|---|
| Binary Pair Input En/Cn | 0/0 | 1/0 | 0/1 | 1/1 | 1/1 | 1/1 | 1/1 | 0/0 | 0/1 | 0/1 | 1/1 | 1/0 |
| B(out)n | 0 | 1 | 2 | 3 | 4 | 3 | 4 | 0 | 2 | 4 | 3 | 1 |

Figure 11:
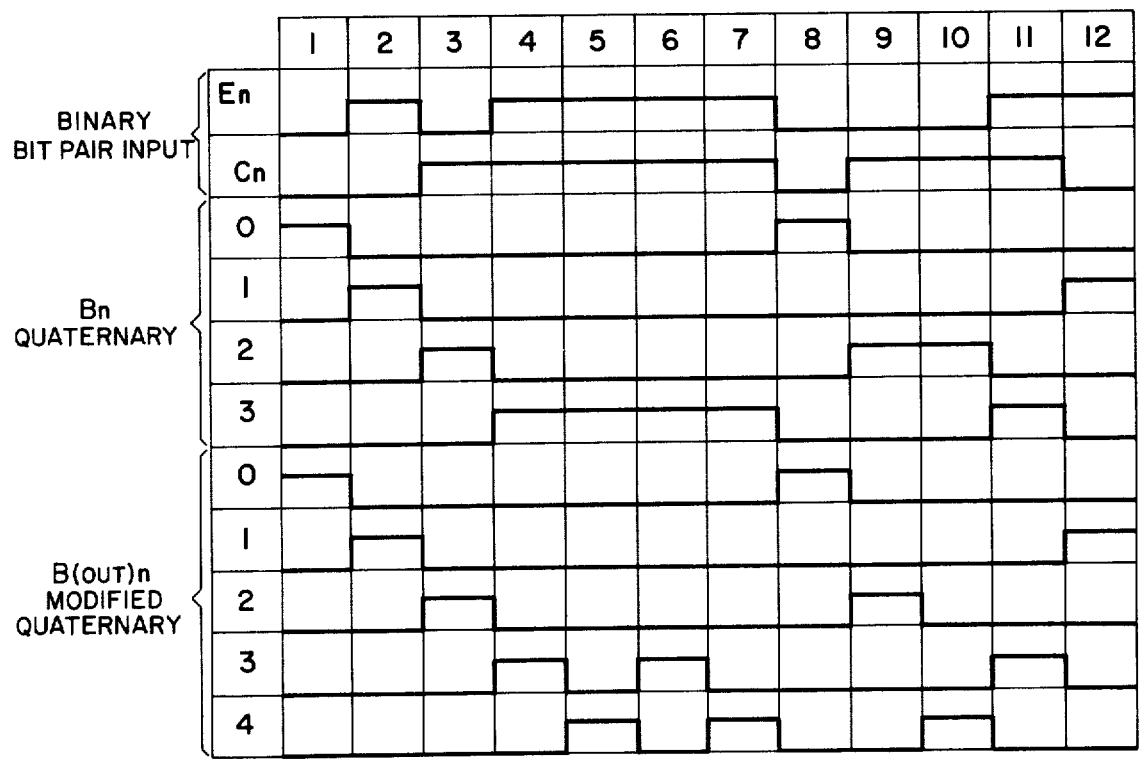
FIG. 11 is a timing diagram useful in understanding the explanation relative to FIG. 10.

As set forth in Table I above and in FIG. 11, the first bit pair E*n*/C*n* input "0/0" has a "0" output. Each input bit pair is different through bit pair number 4 and the B(out)*n* output are correspondingly different. At bit pair number 5, the pair input "1/1" repeats the preceding bit pair and thus a "4" output number is produced. At bit pair number 6, the pair inputs "1/1" again and a "3" output number is produced. At bit pair number 7, the pair input "1/1" again repeats and a "4" output number is produced. The principle is that no two successive pair inputs can produce successive like outputs. Each output is distinct from the preceding output and the occurrence of a "4" value indicates that the pair input represented by the number "4" is the same as the pair input of the preceding bit pair.

From the preceding explanation it will be appreciated that binary coded data is converted to first a quaternary coding, then to an extended or modified quaternary coding which can be transmitted on one of five distinct channels or frequencies.

Figure 14:
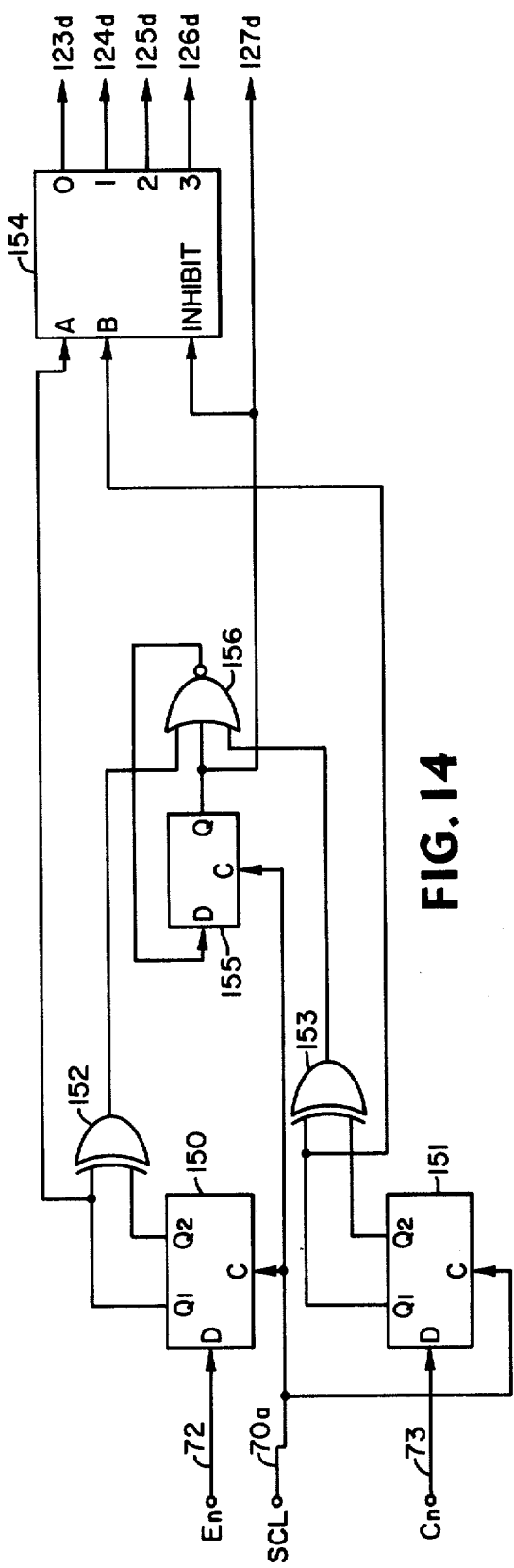
FIG. 14 is a schematic illustration in further detail of the encoder described with respect to FIG. 10.

Referring now to FIG. 14, there is a schematic illustration of one embodiment of the encoder 17*e*. In FIG. 14, there are illustrated two two-stage shift registers 150 and 151 which respectively are coupled to the shift register 17*d* to receive the parallel input data signals via leads 72 and 73. The clocking signal "SCL" is provided via a conductor 70*a* to the shift registers 150 and 151 and to the edge-triggered D flip-flop 155.

The D input of the register 150 is connected to the lead 72. The Q1 and Q2 outputs of the register 150 are connected to the inputs of an exclusive OR circuit 152. The Q1 output of the register 150 is also connected to the "A" input of a two-line binary input to one-of-four-line output decoder 154. The D input of the register 151 is connected to the lead 73. The Q1 and Q2 outputs of the register 151 are connected to the inputs of an exclusive OR gate 153. The Q1 output of the flip-flop 151 is also connected to the "B" input of the decoder 154. For inputs of logic "0/0", "0/1" "1/0", and "1/1" to shift register 150 and 151 where one logic number of a pair is applied to one register and the other number of that pair is applied to the other register, the decoder 154 will produce four distinct outputs on leads 123*d*, 124*d*, 125*d*, and 126*d*.

To provide the fifth output control signal whenever there are two successively alike logic pair signals, an edge-triggered D flip-flop 155 has its D input coupled to the output of a NOR gate 156 whose inputs are connected to exclusive OR gates 152 and 153. The flip-flop 155 is clocked by the signal from lead 70*a* in synchronism with the registers 150 and 151. The Q output of the flip flop 155 provides the fifth distinct output on a lead 127*d* whenever (1) the Q1 output and Q2 output of register 150 are equal, and (2) when the Q1 output and Q2 output of register 151 are equal, and (3) whenever this condition was not obtained during the previous clock time as determined by the logic state 0 of flip-flop 155. This Q output of flip-flop 155 is thus applied to inhibit the decoder 154 and is applied to an input of the OR gate 156. The OR gate 156 also is input by the exclusive OR gates 152 and 153.

Figure 12:
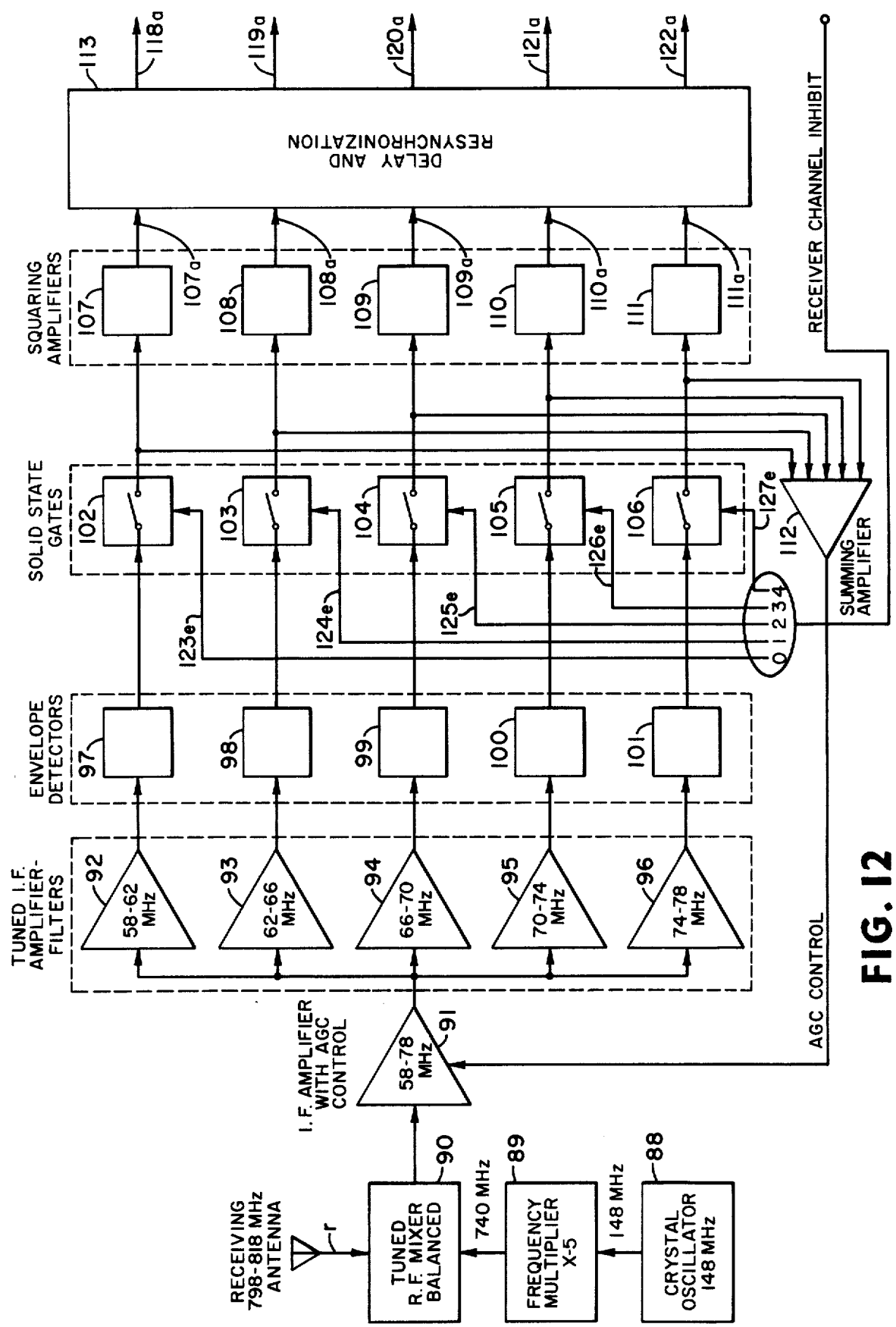
FIGS. 12 and 13 are block diagrams in further detail of the data receiving and transmitting means respectively disclosed in FIG. 6.
Figure 13:
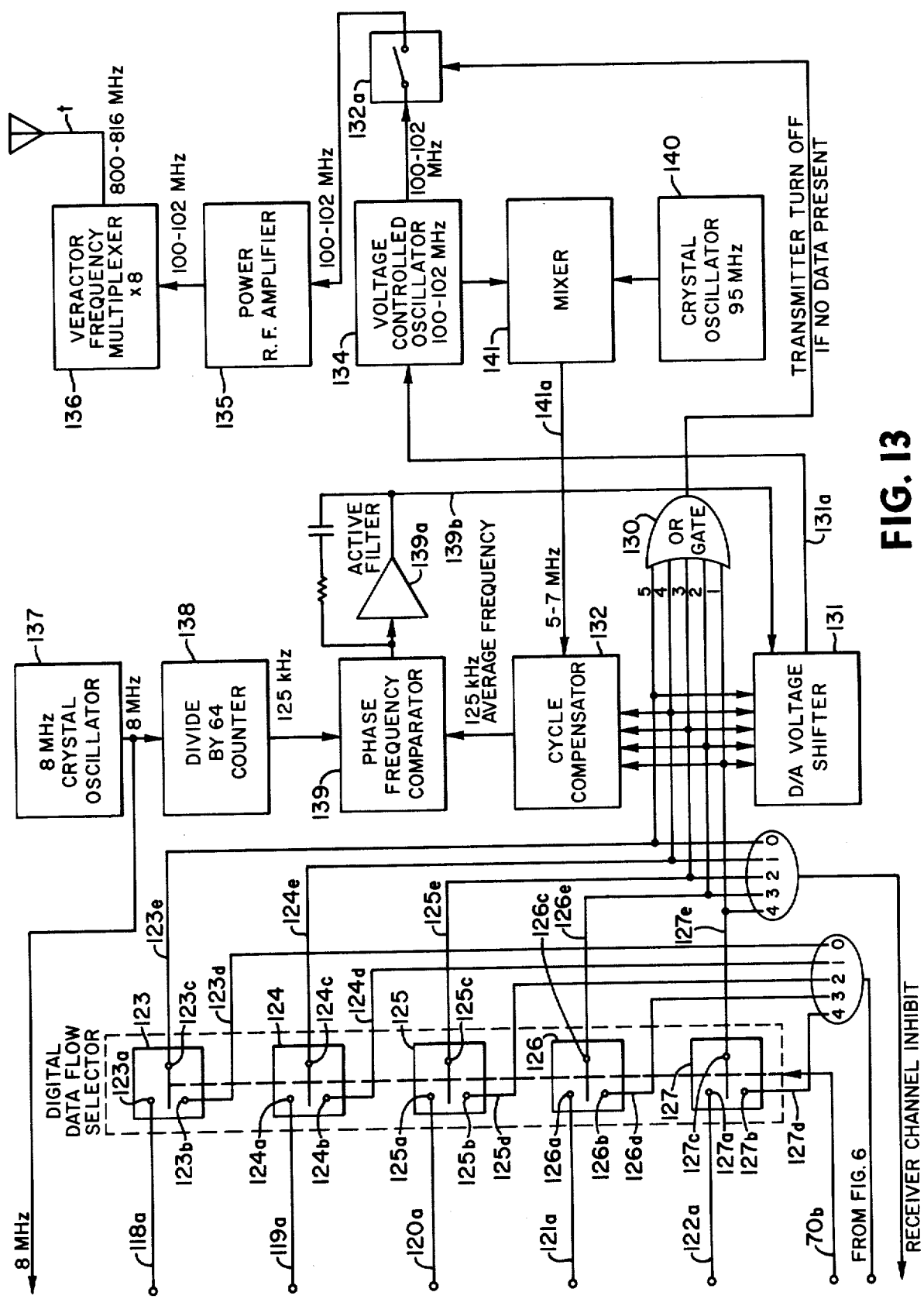

In FIGS. 12 and 13, an embodiment of receiver means 11, selector means 13, and transmitter means 14 are illustrated.

With reference first to FIG. 12, the input signal to the antenna *r* are the transmitted signals which will be assumed to be in the frequency range of 798–818 MHz. The receiver includes a crystal oscillator 88 and a frequency multiplier 89 to input a 740 MHz local oscillator signal to a tuned r.f. balanced mixer 90. The mixer outputs the signal within a 58–78 MHz range through an I.F. amplifier 91 with automatic gain control to the inputs of five filters 92–96 which respectively have band passes of 58–62 MHz, 62–66 MHz, 66–70 MHz, 70–74 MHz, and 74–78 MHz. As explained heretofore, the encoder 17*e* produces five distinct control signals which are representative of extended quaternary encoded numbers. Each of the five signals will be passed by one of the respective filters 92–96 when received by receiver 11. Electrical signal envelope detectors 97–101 are respectively associated with the filters 92–96 and, upon the passing of a signal through a filter, will produce an envelope signal in the form of a pulse which is representative of the amplitude and time duration of the signal. Each of the peak detectors 97–101 is respectively coupled to electronic gates which are schematically illustrated as switches 102–106. Each of the gates 102–106 may, for example, be a COS/MOS bilateral switch which is commercially available for transmission or multiplexing of analog or digital signals. As will hereafter be more fully explained, the gates 102–106 are operational to permit inhibiting the receiver channel upon which the geo-link is retransmitting the previously received and delayed data signal, thereby preventing any interference. Each of the gate outputs of 102–106 is respectively connected to squaring amplifiers 107–111 which square up the envelope signal to produce a rectangular wave signal having the same time duration as the envelope signal. The output from each gate 107–111 is also applied to a summing amplifier 112 which, in turn, provides an automatic gain control input signal to the amplifier 91. Each of the squaring amplifiers 107–111 is respectively coupled to a delaying and resynchronization circuit 113 (illustrated in greater detail in FIG. 17) which delays an input pulse from each squaring amplifier by 1.0 microsecond, reconstitutes the pulse width to 1.0 microsecond and resynchronizes the five channel signals so that no two signals overlap in time. The delay and resynchronization circuit 113 will generate, on the output leads 118*a*– 122*a*, a pulse having a 1.0 microsecond width in response to an input from a corresponding squaring amplifier. The 1.0 microsecond delay avoids interference since the transmitter and receiver are not simultaneously operating on the same frequency due to the modified quaternary coding employed. The pulses generated by the delay and resynchronization circuit 113 are respectively connected to input connections 123*a*–127*a* of an electronic data selector which are schematically illustrated as switches 123–127 (FIG. 14). The data selectors 123–127 may, for example, be AND-OR select gates. The other input connections 123*b*–127*b* of the selectors 123–127 are respectively coupled to input conductors 123*d*–127*d* from the encoding circuit 17*e* (FIG. 6). The data selectors 123–127 respectively have output connections 123*c*–127*c* which are coupled (1) to a control for gates 102–106 (FIG. 12) via lines 123*e*–127*e* for receiver channel inhibiting purposes when the channel data is being applied to the transmitter; (2) to an OR gate 130 for deactivating the transmitter 14 when no data is available to be transmitted thereby; (3) to a digital-to-analog voltage shifter 131 and (4) to a cycle compensation circuit 132.

As long as data signals are being received, the OR gate 130 serves to operate an electronic output gate schematically illustrated as a switch 132a to permit the transmission of signals. Gate 132a may, for example, be a R.F. Pin switching diode. In the absence of data signals, the gate 132a is opened and the transmitter power amplifier is disconnected from its driving stage (VCO 134) to conserve electrical power.

The ratio frequency transmitter comprises voltage controlled oscillator 134 which drives power amplifier 135 through switch 132a, and Veractor frequency multiplier 136 which is coupled to receiver 1. Frequency control for the oscillator 34 is provided by the circuit including crystal oscillator 137, divide-by-64 counter 138, phase frequency comparator 139, active filter 139a, digital/analog voltage shifter 131, mixer 141, crystal oscillator 140, and cycle compensator 132. These components are well known to the art with the exception of cycle compensator 132 and voltage shifter 131 which will be described hereinafter with respect to FIGS. 16 and 18 respectively.

The D/A voltage shifter 131 produces a d.c. voltage signal having a potential related to the particular one of the five frequency signals sensed. This d.c. voltage signal is applied to a voltage controlled oscillator 134. The oscillator 134 generates frequency signals of 100 MHz, 100.5 MHz, 101 MHz, 101.5 MHz and 102 MHz corresponding to five discrete voltage levels of the D/A voltage shifter 131 which are representative of the frequency signals for the five-level coding. The output of the oscillator 134 is passed via the gate 132a to an R.F. power amplifier 135 and thence to a "Veractor" frequency multiplier 136 which outputs the respective signals as 800 MHz, 804 MHz, 808 MHz, 812 MHz and 816 MHz. The multiplier 136 may, for example, be a Veractor coaxial cavity multiplier as marketed by Motorola.

To maintain frequency stability of the five discrete frequency channels and prevent drifting because of temperature, battery voltage, and other factors, a modified phase locked loop is employed. This loop includes reference crystal oscillator 137 with a frequency of 8 MHz which is supplied to divider circuit 138 which divides the frequency by a factor of 64 and applies a 125 kHz signal to phase-frequency comparator 139. Another crystal oscillator 140 operating at 95 MHz inputs to mixer 141. Also applied to the mixer 141 is the output signals of voltage controlled oscillator 134. The output signals of the mixer 141 is supplied to the cycle compensation circuit 132 which will have output frequencies of 5.0 MHz, 5.5 MHz, 6.0 MHz, 6.5 MHz or 7.0 MHz, respectively, corresponding to the five coded channels. The 5-7 MHz signals when divided by 40 result in frequencies of 125 kHz, 137.5 kHz, 150 kHz, 162.5 kHz and 175 kHz. These frequencies correspond respectively to the five transmission frequencies for the five-level code referred to above. Because the reference frequency from the divider circuit 138 is at 125 kHz, the reference frequency would be different from four of the five frequencies in the range 125-175 kHz. Thus, the purpose and function of the cycle compensation circuit 132 is to first divide the 5-7 MHz signal by a factor of 40 and second to output to the phase-frequency comparator 139 via lead 132b a 125 kHz average frequency. Compensating and division of the input frequencies (5-7 MHz) may be better understood by reference to FIG. 15.

Figure 15:
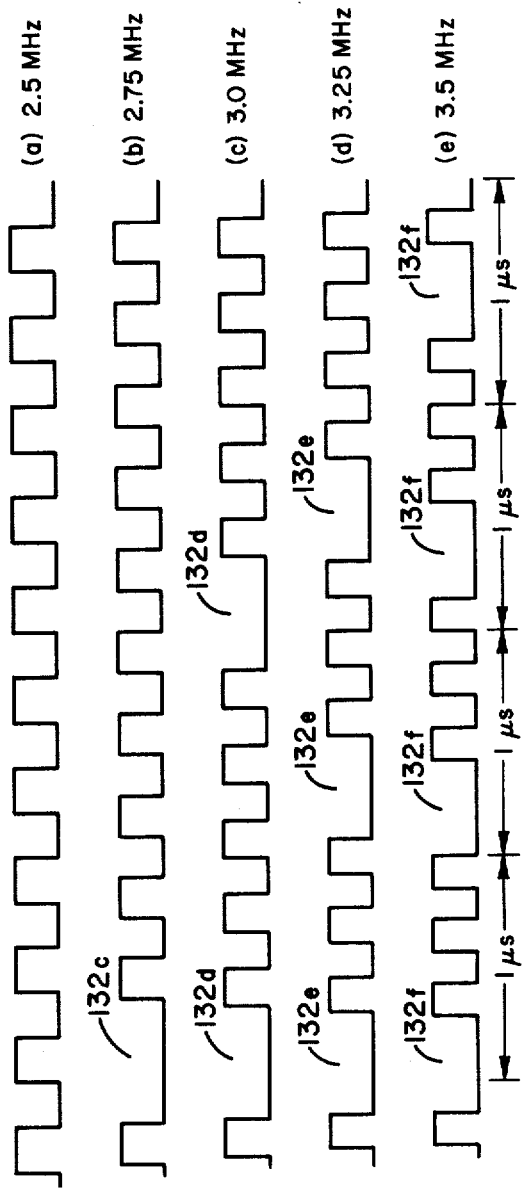
FIG. 15 is a waveform diagram for a better understanding of the cycle compensation circuit of FIG. 16.
Figure 16:
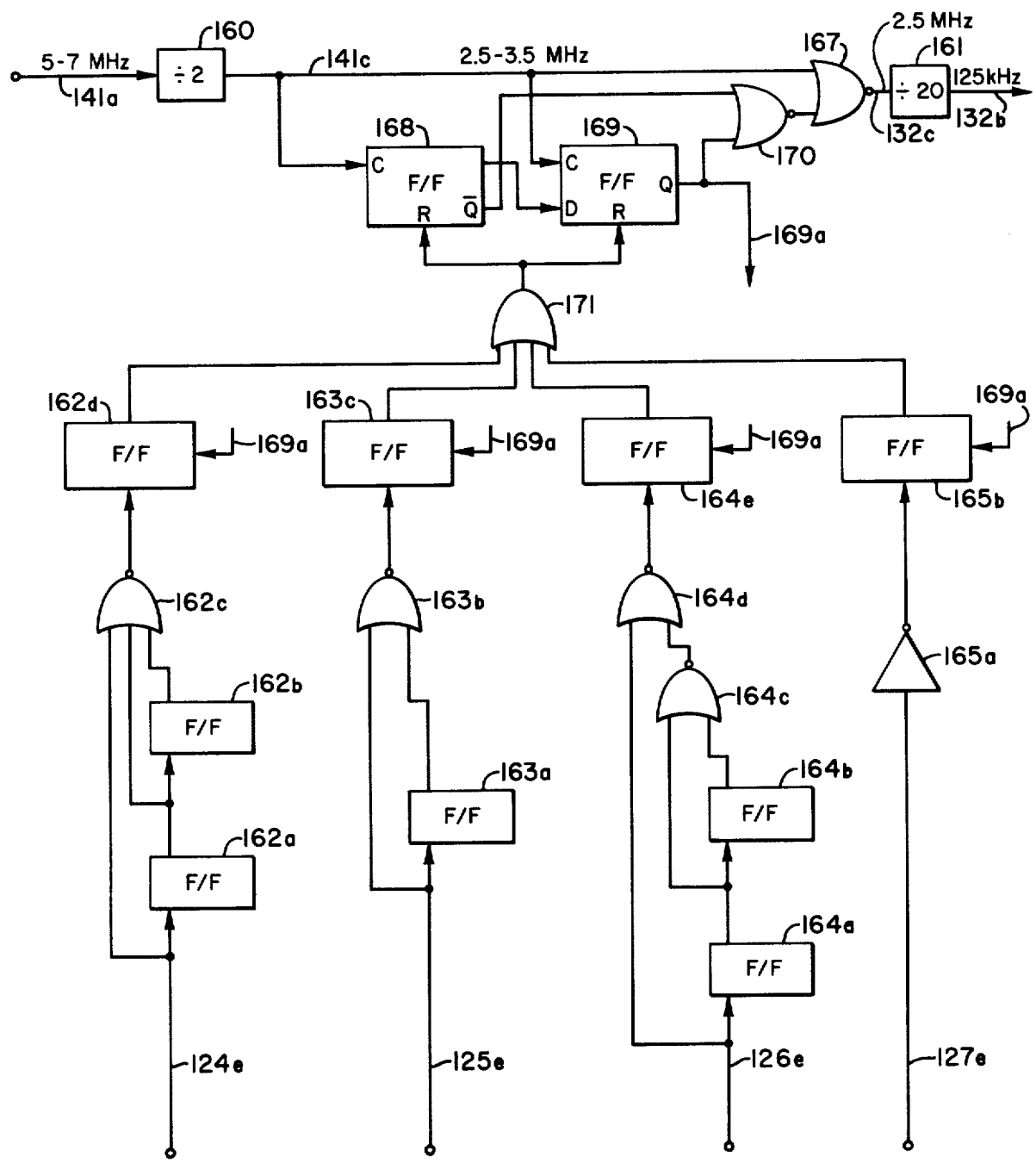
FIG. 16 is a schematic illustration of an embodiment of the cycle compensation circuit disclosed in FIG. 13.

The waveform diagram of FIG. 15 will be helpful in understanding the following description of the cycle compensation circuit 132 illustrated in FIG. 16. Before discussing FIGS. 15 and 16, it should be recalled with respect to the description of FIG. 13 that the cycle compensation circuit 132 receives signals from mixer 141 at frequencies of 5.0 MHz, 5.5 MHz, 6.0 MHz, 6.5 MHz or 7.0 MHz for each of the five frequencies represented in the coding mode. Also applied to the circuit 132 are the output signals from the selector means 123–127. The output signals from the selector means 123–127 are 1.0 microsecond pulses either from the encoder 17e or from the delay and resynchronization circuit 113.

As shown schematically in FIG. 16 and cycle compensation circuit 132 has a divide-by-two circuit means 160 so that the output signal on lead 141c is at frequencies of 2.5 MHz, 2.75 MHz, 3.0 MHz, 3.25 MHz and 3.5 MHz for input frequencies of 5.0–7.0 MHz. Going a step further, if the frequency of 2.5 MHz is further divided by a factor of 20 by a divider circuit 161 the output on lead 132b is 125 kHz. Thus, an input frequency of 5 MHz on lead 141a or a corresponding frequency of 2.5 MHz on lead 141c would produce an output of 125 kHz. If the frequency of the signal at lead 141a is 5.5 MHz, the compensation circuit 162 of FIG. 16 blanks out or eliminates one full cycle of the resulting 2.75 MHz signal on lead 141c during each fourth 1 microsecond occurrence of this signal. This is illustrated by the blanked off portion 132c in waveform (b) and the effective overall number of oscillations on lead 137b in 1 second is 2.5 million. If the input frequency is 6.0 MHz, the compensation circuit 163 of FIG. 16 blanks out or eliminates one full cycle during each second 1 microsecond occurrence of this signal. This is illustrated by the blanked off portions 132d in waveform (c) and the effective overall number of oscillations on lead 137b in 1 second is 2.5 million. If the input frequency is 6.5 MHz, the compensation circuit 164 of FIG. 16 blanks out or eliminates one full cycle for each three out of four 1 microsecond occurrences of this frequency signal. This is illustrated by the blanked off portions 132e in waveform (d) and the effective overall number of cycles on lead 135b in one second is 2.5 million. If the input frequency is 7.0 MHz, the compensation circuit 165 of FIG. 16 blanks out or eliminates one full cycle for each 1 microsecond occurrence of this signal. This is illustrated by the blanked off portions 132f in waveform (e). From the foregoing description it can be seen that the cycle compensation circuit 132 functions to produce an average 125 kHz output on lead 132b irrespective of the different frequency inputs.

As shown in FIG. 16, the 5.0 to 7.0 MHz signal on lead 141a is input to a divide-by-two circuit 160 for the cycle-dropping function as described above. The output from the circuit 160 is applied to one input circuit of a NOR gate 167 and to the clock terminals of edge-triggered flip-flops 168 and 169. The $\overline{Q}$ output of flip-flop 168 and the Q output signal of flip-flop 169 are applied to a NOR circuit 170 which, in turn, provides the other input signal to the NOR circuit 167. The resets of the flip-flops 168 and 169 are controlled by the cycle compensation circuits 162–165 through OR gate 171.

For an input signal of 5 MHz on lead 141a, the cycle compensating circuit shown in FIG. 16 performs only a simple division by a factor of 40 thereby producing a 125 kHz signal on lead 132b. An input signal of 5.5 MHz on lead 141a is accompanied by 1.0 microsecond pulses on lead 124e of compensation circuit 162. The compensation circuit 162 includes two flip-flops 162a and 162b, which are serially connected together. The outputs of flip-flops 162a and 162b together with the input lead 124e provide for three inputs to a NOR circuit 162c. The NOR circuit 162c, in turn, couples to a flip-flop 162d. The output signal of flip-flop 162d is applied to the control OR gate 171. The circuit 162 performs the function of arming flip-flops 168 and 169 via OR gate 171. After arming flip-flops 168 and 169 together with NOR circuits 170 and 167, the passage of one full cycle of the stream of cycles passing from divide-by-two circuit 160 to the NOR circuit 167 is inhibited. After inhibiting the signal flow, the flip-flop 162d is reset via lead 169a. The arming and subsequent cycle interruption occurs after the circuit 162 has been activated an aggregate of four times by the 1.0 microsecond pulses appearing on lead 124e. In effect, the 5.5 MHz input signal on lead 141a is first reduced to 2.75 MHz by divide-by-two circuit 160 and is then reduced to a 2.5 Mhz signal or equivalent of a 125 kHz signal on lead 132b.

An input signal of 6 MHz on lead 141a is accompanied by 1.0 microsecond pulses on lead 125e of the circuit 163. The compensation circuit 163 includes a flip-flop 163a whose output signal is applied together with the signal appearing on lead 125e to a NOR circuit 163b. The NOR circuit 163b, in turn, couples to a flip-flop 163c the output signal of which is applied to the control OR gate 171. The circuit 163 performs the function of arming flip-flops 168 and 169 via OR gate 171. After arming these two flip-flops, one full cycle is dropped from the stream of cycles passing from circuits 160 to 167. The arming and subsequent cycle interruption occur twice for each four applications of 1.0 microsecond pulses appearing on lead 125e. After interrupting the signal flow, flip-flop 163c is reset via lead 169a. In effect, the 6 MHz input signal on lead 141a is reduced first to 3 MHz by divide-by-two circuits 160 then reduced to a 2.5 MHz signal or equivalently a 125 kHz signal on lead 132b.

An input signal of 6.5 MHz on lead 141a is accomplished by 1.0 microsecond pulses appearing on lead 126e of compensation circuit 164. The compensation circuit 164 includes two serially connected flip-flops 164a and 164b; the output circuit of flip-flop 162b is applied to one input of NOR circuit 164c. The output of flip-flop 164a also is applied to an input circuit of NOR circuit 164c. The output of NOR circuit 164c together with input lead 162e are applied to separate input circuits of NOR circuit 164d. The NOR circuit 164d is coupled to flip-flop 164e. The output of flip-flop 164e is applied to the OR gate 171. The circuit 164 via the OR circuit 171 performs the function of arming flip-flops 168 and 169 for the purpose of interrupting the cycle flow, as stated above. The arming, subsequent cycle interruption, and resetting of flip-flop 164e occur three times for each four applications of 1.0 microsecond pulses appearing on lead 126e. In effect, the 6.5 MHz signal input to lead 141a is first reduced to a 3.25 MHz by divide-by-two circuit 160 and then reduced to 2.5 MHz on lead 137b or equivalent of 125 kHz on lead 132b.

An input signal of 7 MHz on lead 141a is accompanied by 1.0 microsecond pulses on lead 127e of compensation circuit 165. The compensation circuit 165 includes inverting circuit 165a which is connected directly to an input circuit of flip-flop 165b. The output of flip-flop 165b is applied to the control OR gate 171. The circuit 165 via OR gate 171 performs the function of arming flip-flops 168 and 169 and the subsequent cycle interruption, as explained above. After inhibiting the signal flow, flip-flop 165b is reset via lead 169a. The arming and subsequent cycle interruption occur each time circuit 165 is activated by a 1.0 microsecond pulse appearing on lead 127e. In effect, the 7.0 MHz signal input to lead 141a is first reduced to 3.5 MHz by divide-by-two circuit 160 and then reduced to a 2.5 MHz signal on lead 132c or equivalent of 125 kHz signal on lead 137b. It will be appreciated that the divide-by-20 circuit 161 produces a uniform and regular output signal as its output responds to each group of 20 input pulses, through their spacing in time may be irregular.

Figure 17:
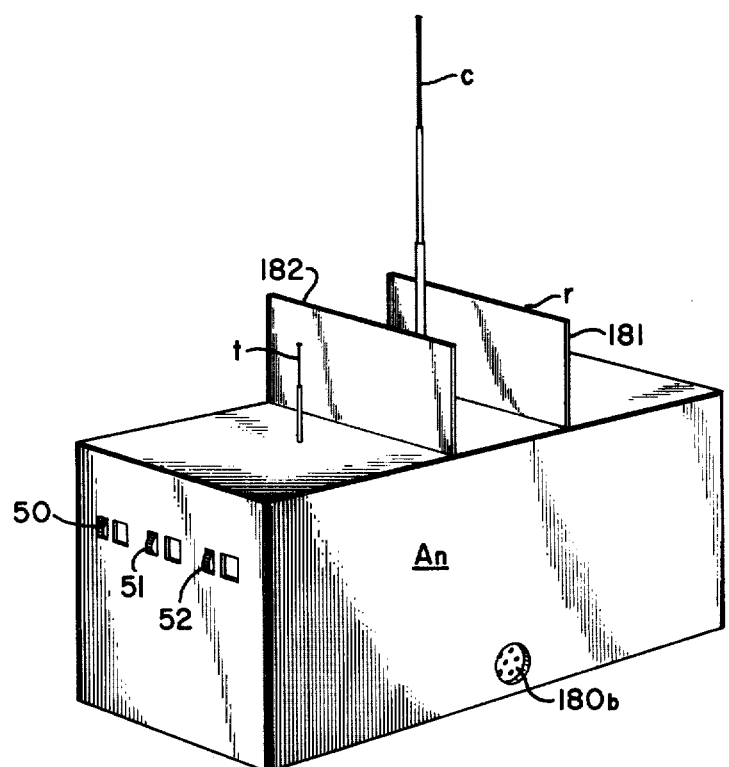
FIG. 17 is a perspective view of a physical configuration for the component unit (geo-link) of FIG. 2.

Referring now to FIG. 17, the geo-link An is illustrated in a typical physical configuration which includes a case member 180 for enclosing the various electronic components for the unit. A geophone input plug 180b is provided in the side of the case 180 and thumb-wheel operated switches 50–52 of BCD coder 19 are conveniently located on the case. A pair of R.F. frequency reflectors 181, 182 are disposed near the center of the case. The reflectors and case top increase the gain of both the receiver antenna r and the transmitter antenna t. Intermediate of the reflectors 181 and 182 is the command antenna c. The antennas r, t, and c are telescopic so as to collapse into the case. Reflectors 181 and 182 may be pivotally coupled to the case to pivot to a position covering the upper face of the case over the antennas r and t so that a lid may be conveniently used to cover the top of the case. As will be appreciated, the reflectors 181 and 182 increase the strength of transmitted and received energy by 6 decibels but also require the units to be appropriately aligned for proper unit-to-unit transmitter-to-receiver coupling.

Figure 18:
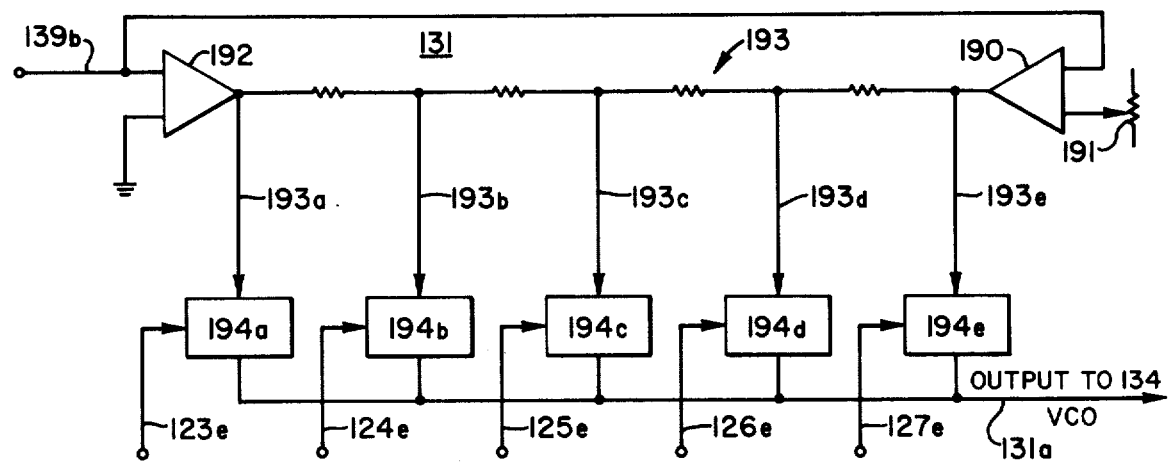
FIG. 18 is a schematic illustration of an embodiment of the digital-to-analog voltage shifter disclosed in FIG. 13.

Referring now to FIG. 18, a particular embodiment of a digital-to-analog voltage shifter 131 is illustrated. In FIG. 18, a first operational amplifier 192 and a second operational amplifier 190 with an offset adjustment means 191 are arranged so that both amplifiers receive a voltage signal input from an active filter 139a via the lead 139b, representative of the error signal generated by phase-frequency comparator 139. This error signal is representative of the difference between the 125 KC reference output by divider circuit 138 and the 125 KC signal output by cycle compensation circuit 132. By adjusting the offset means 191 of the amplifier 190 a predetermined difference in potential between the output signals of amplifiers 192 and 190 can be established irrespective of the shift in potential at the input circuits thereof. The output signals of the amplifiers 190 and 192 are coupled across a voltage divider network 193 which can produce five distinct voltage level outputs 193(a–e). The output lines 193(a–e) are respectively connected to gates 194(a–e) which are respectively gate controlled by the input signals on leads 123e–127e. Thus when an error signal is applied to D/A shifter 131 via lead 139b a proper correction for long term drift due to aging, temperature, and battery change is applied to the voltage control oscillator 134 via the lead 131a. However, short time duration 1 microsecond pulses applied to leads 123e–127e shift the frequency of the voltage controlled oscillator as required without affecting the long term stability due to the compensatory effect of the cycle compensating circuit.

Figure 19:
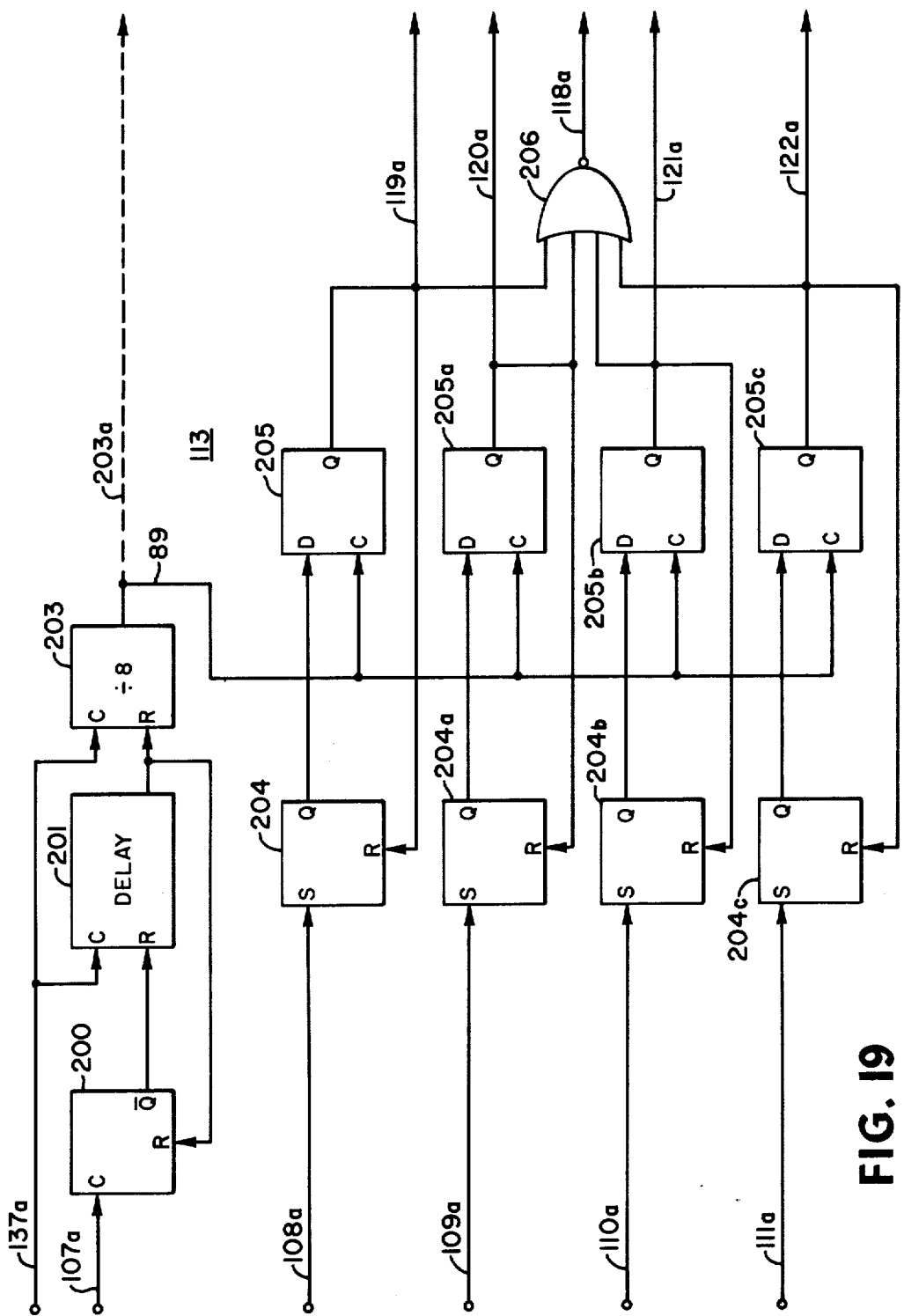
FIG. 19 is a schematic illustration of an embodiment of the delaying and resynchronization circuit disclosed in FIG. 12.

Turning now to FIG. 19, the delay and resynchronization circuit 113 operates first to provide a delay of 1.0 microsecond for each signal received before the signal is retransmitted, second to restore the 1 microsecond pulse width, and third to realign the 1 microsecond pulse in time so they do not overlap. Because the signals are at different frequencies and because detection times can shift as a function of the signal strength or rise time for a given frequency signal, circuit 113 is arranged to clock the pulses to a base reference signal. This reference is chosen as the signal from circuit 107 of FIG. 12 which is representative of the 60 MHz I.F. frequency signal or alternatively the 800 MHz transmitted signal. This base or reference signal is input to an edge-triggered flip-flop circuit 200. The $\overline{Q}$ output of circuit 200 is applied to the reset input circuit of a 1.0 microsecond clocked delay circuit 201 which also can be a flip-flop circuit. The delay circuit 201 is clocked by an 8 MHz signal on lead 137a received from the 8 MHz oscillator 137 of FIG. 13. The delay circuit 201 is responsive to the input to provide an output signal 1 microsecond after the input is clocked. The clock signal is also applied to input circuit C of divide-by-eight circuit 203. The divider circuit 203 produces repetitive clocked output pulses at 1.0 microsecond intervals and is resynchronized to the delayed base signal after each occurrence of this signal on lead 107a. The transmitted and received signals from each geo-link unit includes as a first digit the signal to operate and initiate the timing or synchronizing of the clocking pulses from the circuit 203. Each time that lead 107a is actuated the clock circuit 203 is resynchronized. The circuit 108 of FIG. 12 for the second channel is coupled to the "set" input of a flip-flop circuit 204 which stores the input data pulse. The Q output of circuit 204 is coupled to the D input of a flip-flop 205 the output signals of which are applied to a NOR gate 206. The circuit 109 for the third channel is coupled to the "set" input of a flip-flop circuit 204a. The Q output of circuit 204a is coupled to the D input of a flip-flop 205a which is output to the NOR gate 206. The circuit 110 for the fourth channel is coupled to the "set" input of a flip-flop circuit 204b. The Q output of the circuit 204b is coupled to the D input of a flip-flop circuit 205b the output signal of which is applied to the NOR gate 206. The circuit 111 for the fifth channel is coupled to the "set" input of a flip-flop circuit 204c. The Q output of the circuit 204c is coupled to the D input of a flip-flop circuit 205c which is output to the NOR gate 206. The clocking pulses from circuit 203 are input to the clock inputs of each of the flip-flops 205, 205a, 205b, and 205c.

Whenever circuit 203 produces a clocking pulse and if there is no input signal at any of the flip-flops 205, 205(a–c) then the OR gate 206 produces a signal of 1.0 microsecond width on the lead 118a. As signals sequentially occur at the various flip-flops 204 and 204(a–c) thereafter, such signals are respectively applied to leads 119a–122a. The output signals are also respectively coupled back to the reset input circuits of the flip-flops 204, 204(a–c) for re-establishing the initial conditions of each flip-flop.

The effect of the clocking pulses from the circuit 203 is that the output signals on the leads 119a–122a are exactly at 1.0 microsecond pulse widths and have no time overlap. The output pulse from NOR circuit 206 following the occurrence of a signal from the circuit 107 is of sufficient width to take up any gap in the sequence of output pulses. The advantage of this technique is the elimination of any possible dead time or overlap between pulses.

Figure 20:
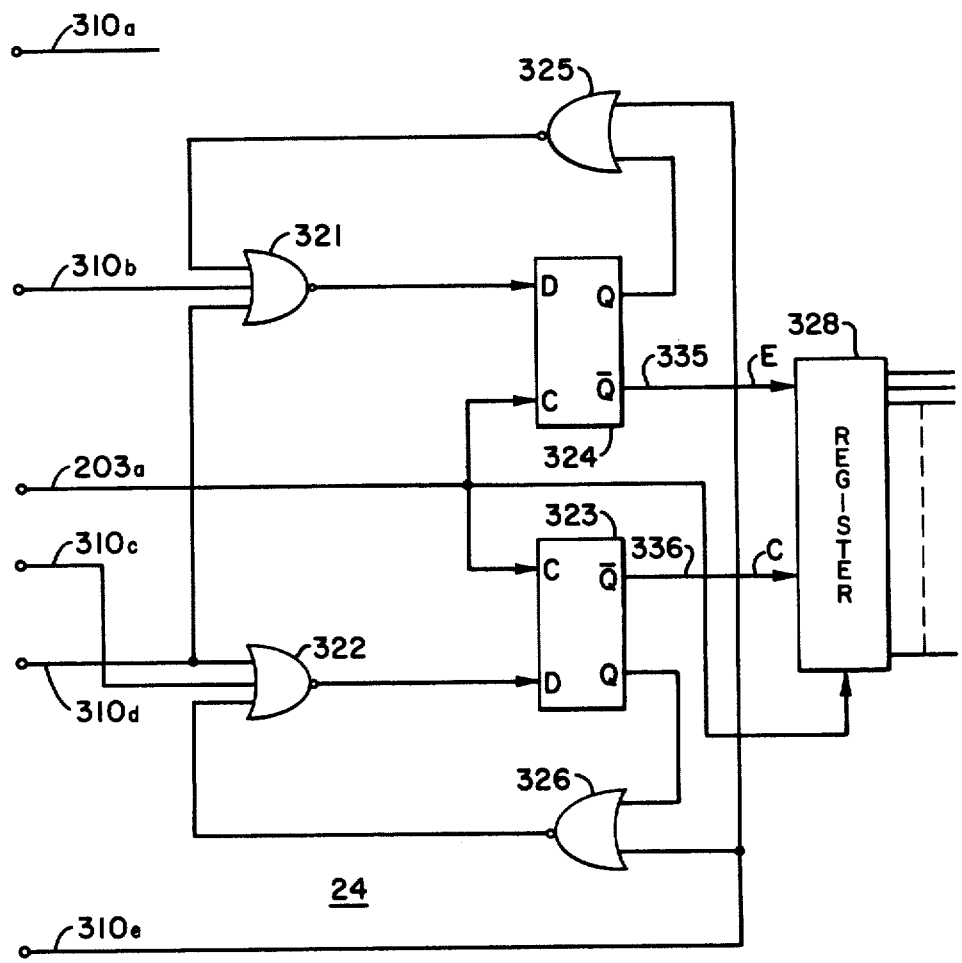
FIG. 20 is a schematic illustration of an embodiment of the decoder to reduce the transmitted radio data signals encoded by the circuit of FIG. 10.

Refer now to FIG. 20. Inasmuch as the data from the geo-link nearest truck 10 is received at truck 10 in a modified quaternary or a fivelevel base code, it must be decoded to the original two-line binary form before it is placed into the recording means. The data is received by the antenna R on the receiver 23 (FIG. 5) which includes a processing system similar to that described with respect to FIGS. 12 and 19 so that sequential, time synchronized output pulses representative of the five-level code are obtained. Inasmuch as the pulses appearing on the line 310a indicative of the binary pair 0/0 will be present whenever no pulse is present on the other lines, only the pulses on lines indicative of the binary pairs 0/1, 1/0, 1/1, and a repeat of the previous pair, need be applied to the decoder. Therefore the decoder circuit 24 has only four line input leads 310b, 310c, 310d, and 310e. Line 310a is shown as a dead lead not connected to the decoder circuit.

The purpose of the decoder circuit 24 is two-fold: (1) to decode the five-level modified quaternary code appearing on five separate lines into a two-line binary format; (2) should the original encoded modified quaternary data contain the fifth level value of "4", then two successive data values are alike. Therefore, the circuit 24 in FIG. 20 rectifies or reinserts the previous data value in place of the "4" or fifth channel.

The operation of the decoder circuit 24 is as follows: when a pulse appears on dead line 310a, indicative of a level value of "0", no pulses appear at the output of NOR circuits 321 and 322. A pulse on line 310b will produce a pulse at the output of NOR circuit 321 but none at the output of NOR circuit 322. Likewise, a pulse on line 310c will produce an output pulse on line 322 but none on line 321. A pulse on line 310d will produce pulses at the output circuits of both NOR circuits 321 and 322. Under normal circumstances, if no two successive pulses on leads 310a–310d are different, channel four (which appears on lead 310e) will not be active. Therefore the data presented to the flip-flops 324 and 323 will be clocked and transmitted to the output lead 335 and 336 by operation of the clock signal on lead 203a. (This clock signal appearing on lead 203a is generated in a delaying and resynchronization circuit similar to that of FIGURE 19.) If however the fifth-data-channel is activated via lead 310e (indicating that the decoded output should be the same as the previous output), the normal decoding of data from lead 310b–310d is inhibited and the previously decoded two-line binary data is routed through NOR circuits 325 and 326 and through NOR circuits 321 and 322 to the input circuit of flip-flops 324 and 323 to produce pulses on leads 335 and 336. It therefore can be seen that the decoding circuit 324 reconstructs the two-line binary data. The data on leads 335 and 336 is fed to a serial input-parallel output register of the type where line 335 can load the upper half of the register and line 336 can load the lower half of the register under the control of clock line 203a. The parallel output of the register can then be recorded by a conventional seismic digital recorder using techniques and apparatus well known to the art.

Figure 21:
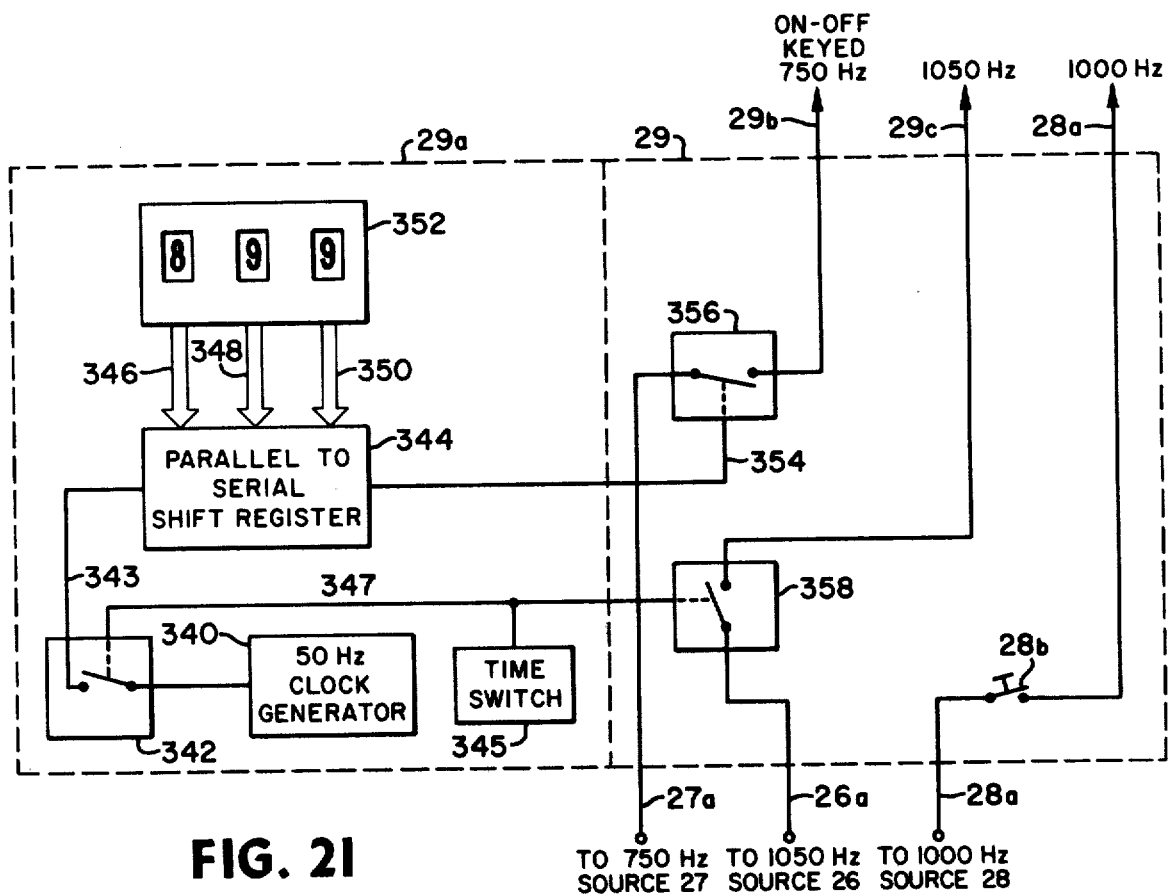
FIG. 21 is a block diagram of the code generator and code input selector disclosed in FIG. 5.

Refer now to FIG. 21 wherein is illustrated in block form suitable apparatus for use as the code input selector 29a and code generator 29 shown in FIG. 5. The code generator 29 includes a switch 358 connecting line 26a to line 29c and a switch 356 connecting line 27a to line 29b. The switches are illustrated as mechanical but are preferably high-speed solid state switches of types well known to the art. Code input selector 29a includes a switch unit 361 comprising three binary coded decimal switches each having a group of four output leads designated by reference numerals 346, 348, and 350. The group of output leads is connected to a parallel-to-serial shift register so that the 12 signals on the leads are presented to the shift register in parallel. The serial output on the shift register through line 354 is applied to switch 356 for actuation thereof. The shift register is actuated by a 50 cycle clock signal derived from clock generator 340 through a switch 342 similar to switches 356 and 358. The output pulses from the clock generator appearing on line 343 are applied to the register 344 for actuation thereof. Switches 342 and 358 are actuated via line 347 from a time switch 345 which is adapted to close the switches for a fixed time interval such as 240 milliseconds for reasons which will become apparent below. The code generator 29 also includes a manually actuable switch 28b in line 28a for controlling the 1000 Hz signal appearing on line 28a to be applied to transmitter 20.

As has been mentioned above, the code generator 29 initiates the 1000 cycle timing signal so that all geo-link units can thereby be turned on simultaneously. The code generator 29 also produces the 750 cycle on-off keyed update signal previously described which together with the 1050 Hz pilot signal control the appropriate time during which the units are to be updated. For illustration purposes, the number 899 is illustrated as having been placed into the binary coded decimal switch unit 352 to transfer the number into register 344 via groups of lines 346, 348, and 350. Before initiation of a seismic disturbance, the switch 28b is closed and the 1000 cycle signal is applied to transmitter 20 of FIG. 5. Timing switch 45 is activated to produce the previously mentioned 1050 pilot tone on lead 26c which is supplied to the transmitter 20. The 50 cycle clock signal is also activated and applied to actuate the shift register 344. The pulses stored in the shift register by the switch 352 are serially shifted as a stream of binary 1's and 0's to actuate switch 356 thereby keying the 750 Hz signal. Each binary 1 which is present for a period of 20 milliseconds for example, turns on the 750 Hz signal; each binary 0 (which is also present for a period of 20 milliseconds) turns off the 750 cycle signal. After a period of 240 milliseconds, switches 340 and 358 are opened so that the geo-link units now have the number that was originated by binary coded decimal switch unit 352 transferred to the registers 59, 60, and 61 of FIG. 8 via the radio command signal C1. It should be noted at this point that when the 1000 Hz signal is discontinued by opening switch 28b to remove power from the geo-link units, the registers 59, 60, and 61 automatically are cleared of all information stored therein and returned to an all-"0" state.

The switches 340 and 358 are actuated by the time switch 345 for a sufficient time interval to shift the number placed in register 344 completely out of register 344 to actuate switch 884. Assuming that each decimal number originated by unit 352 is internally transformed into a binary coded decimal number comprising four bits, and further assuming that each binary bit has a period of 20 milliseconds, then the total time that switches 342 and 358 must be closed is 240 milliseconds.

DESCRIPTION OF OPERATION

The procedures for obtaining a seismic survey, in accordance with the principles of the present invention, are generally as follows:

A survey crew will establish survey stakes having numbers such as 2102 through 2182 as illustrated in FIG. 1 at spacings which typically could be 220 feet, 440 feet or some other desired spacing. After the survey stakes are located, the individual geo-link units are located at each of the survey stakes and arranged so that the transmitter antenna of one geo-link is aligned with the receiver antenna of the next adjacent geo-link unit. The alignment insures directional transmission and reception. As the geo-link units are located, each unit is coupled to the geophone spread. Each geo-link is given a sequential coded number by use of the three thumb-wheel control knobs, 51–52 (see FIGS. 8 and 17). Assuming a setup such as illustrated in FIG. 1, where the stake numbers designation increases in value as the stakes approach the truck 10 and assuming that it is desired to select the 50 units beginning with unit A1, the thumb-wheel control for unit A1 would be set at "101", unit A2 would be coded or set at "102" and so forth with each unit until the unit A82, which is ultimately coded "182." For purposes of this explanation, all of the units between the geo-link unit A82 and the truck 10 may be considered as units An which are correspondingly, sequentially and serially numbered.

For the selection of units A1 through A50, the command code number would be "900," which, when added to the last three digits of the stake numbers, would result in a sequential coding of one through 51, beginning with the unit A1 and ending with the unit A50. As previously explained with respect to FIGS. 7 and 8, when the code number command signal arrives at the geo-link units, an electrical code from "1" to "50" is provided to the comparators 40. Upon the occurrence of the pulse code number 1 at the comparator or geo-link unit A1, the geo-link disconnects as a relay unit and transmits its acquired data onto the line.

At the truck unit the system is turned on. Initially, the transmitter at the (FIG. (FIGURE 5) transmits the digitally coded "900" command signal, as well as a 1000 Hz timing signal. The 1000 Hz timing signal also is supplied to the recording mechanism in the truck. The timing signal and the command signal from the truck are received by the respective command antenna c (FIGS. 7 and 8) of each geo-link unit. Upon reception of the command signal, which is comprised of the 750 Hz keyed-code number and the 1050 Hz reference signal, the digital code number "900" is transferred to registers 159 through 161 of circuits 15 in each geo-link. This digital code number, when added to the preset number supplied by thumb-wheel switches 50 through 52 of FIG. 8, selects the proper time pulse by action of the comparator 40. Each of the units A1 through A50 are now properly sequenced. At the time when the unit A1 is actuated by the first timing pulse in its comparator 40, the control and timing unit (FIG. 8) has previously enabled the binary gain amplifier 17a, the sample-and-hold circuit 17b, the analog-to-digital converter 17c and input all of the data into a register 17d. Each of the geo-link units constantly receives the seismic analog signal. At the coincidence command from a comparator, the selection means 123 through 127 (FIG. 13) shifts the modified quaternary coded data from the encoder 17e to the D/A voltage shifter 131, the cycle compensation circuit 132 and the OR gate 130. The OR gate 130 turns on the transmitter for the particular unit and the D/A shifter 131 frequency-shift keys the VCO 134 according to a five-level code. The voltage control oscillator 134 drives a power amplifier 135. A multiplier 136 excites the geo-link transmitter antenna *t*. To prevent drift and maintain the consistency of the output frequencies, the output signal of voltage control oscillator 134 and the output signal from a crystal oscillator 140 are applied to a digital mixer 141 which supplies a hetrodyne reference frequency to a cycle compensation circuit. In the cycle compensation circuit 132, each of the various frequencies is compensated for to provide an average output signal of 125 kHz which is supplied to a phase-frequency comparator 139. The phase-frequency comparator 139 compares the 125 kHz output signal derived from a crystal reference oscillator 137 and by virtue of a filter 139a supplies a correction voltage to the D/A shifter whenever the output frequency 132 drifts from the average of 125 kHz. The transmitted signals may be within the range of 798 to 818 MHz. Each output multiplier 136 signal has a duration of 1 microsecond and the frequency value respectively indicates a coded digit value for a pair of binary digits. The various signals from antenna *t* are received at antenna *r* of an adjacent geo-link and are mixed with a 740 MHz local oscillator signal in a mixer 90 (FIG. 12).

The 1000 Hz timing signal at each unit provides for incremental sampling of the analog seismic signal and digitizing of the sample. For transmitting purposes, binary digit values in serial form are bifurcated between an even number of digit values in the first half of a data word and an even number of digit values in the last half of a digit word. The paired bits are input to a modified quaternary coder which produces five distinct outputs respectively corresponding to the four possible pair combinations of binary values and to the occurrence of a repetitive pair combination. The five distinct outputs thus carry binary coding in pairs represented by five frequency signals. Each of the five frequency signals occurs in sequence and for a 32-bit binary word, 16 sequential shifts in frequency occur.

When the command signal and timing signal activate a geo-link, the sampled and coded signal is converted to a higher frequency signal (800–816 MHz) for transmission. At the adjacent geo-link, the higher frequency signals are reconverted to the initial distinct outputs as generated by the originating geo-link so that the same type of transmitting unit can be used and reconstitute the higher frequency signals. Thus, the units can be identical in employing higher frequency signals for transmission where the frequencies are a function of frequency shift coding. The corresponding frequency signals for the coded signals are converted to pulse signals which operate the D/A voltage shifter 131 and a voltage controlled oscillator. Thus the coded signals are then reconstituted by the transmitter circuit for relay to the next unit.

Restating the function of the system, a command signal and timing signal are issued by the control truck 10 to all of the geo-link units. Each geo-link unit is programmed numerically in sequence relative to the surveyors stake numbers. For an ascending numerical sequence of the geo-links towards the truck, a number is issued in the command signal and the summation of this number and the noncomplemented binary number of the geo-link provides a distinct selection input for 50 units to a comparator 40. The comparators 40 in each unit, in response to the timing signal, also provide a repetitive sequence of selection from one through 50 increments of time so that each of the units responds once in a sequence or scan of the 50 timing signals provided by the comparators 40. If the number value of the command signal is changed, the group of units which responds is correspondingly changed because of the new summation values in the units.

For a descending numerical sequence of the geo-links towards the truck, the complement selectors 53, 55, and 57 are actuated so that a command signal will actuate the geo-links in a sequence which again begins with the most remote selected unit.

The transmission of the data is in a coded format utilizing frequency shifting in the 60–900 MHz band. Each unit serves as a repeater or relay of the data signal unless actuated by the command signal to interject its own sampled data into the transmission system. Therefore, geo-link units with simple relay functions may be placed between the recording truck and the group of 50 data gathering units. The truck may then be stationary while the active group of geo-links is moved for each occurrence of a seismic impulse.

It is important to note that the output signals of the binary gain amplifiers 17a in all of the geo-link units are simultaneously sampled. The timing signal T1 produces a signal SAM on all of the lines 67a to cause simultaneous sample-and-hold action in all of the units. Also the A/D converter 17c is activated about 20 microseconds after the sample-and-hold circuits are activated and the signal value is made available to the shift register 17d. The above sequence is repeated four times per scan in each active geo-link unit. However, only the digital value of the last so converted signal is loaded into shift register 17d by means of load signal SLO appearing on line 67d. This converted signal value is then held in register 17d until the proper transmission time is indicated by the appearance of the SCL signal on line 70a, whereupon the digital signal value is shifted to encoder 17e.

It is apparent that the sequence of sampling the geophone analog signal and producing digital encoded signals representative thereof is carried out four times per scan interval while only the last such sampling, holding, and converting action is allowed to be introduced into the radio data relay link. Since the gain control of the binary gain amplifier is conditioned by the output number found in the A/D converter 17c the intermediate conversion allows the amplifiers to sense overloads and continually follow the incoming amplitudes. By "overload" as used above is meant the driving into saturation of the A/D converter by a signal outside the input acceptance range of the A/D converter. The presence of such a signal may cause the converter to go into saturation and thereby become inactive for a time greater than a scan period.

The above description of the overall operation of the apparatus described heretofore was made assuming instantaneous propagation of radio waves from the control transmitter to each individual detecting station and from one detecting station to another. However, this is not actually the case inasmuch as the propagation rate of radio waves is approximately 1000 feet per microsecond. Therefore the individual geo-link units will progressively lag in time by one microsecond per pair of stations if the stations are 1000 feet apart. Therefore, assuming a station spacing of 1000 feet, the station farthest from the truck would have its timing cycle delayed by approximately 50 microseconds as compared to the station closest to the truck. However, this does not inhibit the functioning of the apparatus described heretofore inasmuch as, assuming a 50 station spread, a 1-millisecond scan interval, and 16 1-microsecond data bits per station, there are 4 microseconds between the end of one block of data being transmitted from one station to another and the beginning of another block. This 4 microseconds is sufficient to absorb the time crowding of data blocks due to propagation delay. With the parameters of 50 stations each producing 16 1-microsecond data bits which comprise a data word, no more than 1000 feet between adjacent detecting locations, and with a 1-millisecond scan interval, the dead time between stations shrinks from 4 microseconds to 1 microsecond which is sufficient to prevent any overlap of data blocks. However, should it be desirable to increase either the distance between the stations or increase the number of stations, then the data block length would have to be reduced from 16 microseconds to a smaller period of time, or the scan interval or the sample rate would have to be increased in time to more than 1 millisecond.

Manifestly, other modifications may be made without departing from the spirit and scope of the invention. For example, it is possible to transmit on three frequencies rather than five as described herein should it be desirable to use binary coded bits for transmission rather than quaternary coded bits. This, however, would require decreasing the number of bits per block or increasing the scan interval so that the same volume of seismic information may be gathered and presented for recording at the recording truck. In general, radio transmissions may be made on "$n + 1$" different frequencies where "$n$" is the number of different digits in the digital code, the transmission of each digit value in the code being transmitted on a particular one of said "$n$" frequencies except where the same digit value occurs twice in succession. In this instance the second occurrence of said digital value is transmitted on the "$n + 1$" frequency. Furthermore, it will be recalled in the present invention that pairs of binary bits were employed together to generate quaternary bits which were in turn used for transmission purposes. These pairs of binary bits may be obtained from the 32 bits of binary information present in register $17d$.

It may be desirable on occasion to employ a coaxial cable or similar wave guide means to transmit the digitally encoded signals from one geo-link unit to another. In some instances, for example, it may be difficult to transmit radio signals between units because of terrain or other factors. In these situations the transmitting antenna of the transmitting unit and the receiving antenna of the receiving unit can be removed and replaced by the ends of a coaxial cable.

We claim:

1. In a seismic surveying process wherein a seismic energy disturbance is produced at transmitting location for producing seismic impulses at detecting locations along a traverse, the improvement comprising:
   transmitting control signals to each of a plurality of detecting locations located along said traverse,
   producing electrical signals at each of said detecting locations as a function of said seismic impulses,
   sampling said electrical signals at each of said detecting locations and generating distinctively coded signals representative of the magnitude of each sample; and in response to said control signals,
   originating discrete transmissions of said coded signals in a predetermined sequence from a selected number of said detecting locations;
   for each discrete transmissions, receiving and retransmitting said coded signals at each location in order along said traverse;
   wherein the step of transmitting control signals includes the transmission of command signals which include selection signals for selecting the selected number of locations and timing signals for sequencing said selected number of locations, and
   wherein the step of generating distinctively coded signals includes the step of converting said electrical signals into binary coded signals, and
   further including the step of converting said binary coded signals into quaternary coded signals and an extra signal for differentiating between successive-like quaternary or extra signals.

2. The method of claim 1 wherein said step of converting to said quaternary signals and said extra signals includes producing corresponding signals at five separate frequency bands in the range of 500–1000 MHz.

3. In a seismic surveying method wherein a seismic energy disturbance produces seismic impulses at a plurality of detecting locations along a traverse and electrical signals are generated at each of said detecting locations as a function of said seismic impulses, the improvement comprising:
   a. sampling said electrical signals at each of said detecting locations and generating distinctively coded signals for radio transmission, said coded signals being representative of said sampled electrical signals,
   b. originating discrete radio transmissions of said coded signals in a sequence from a selected number of said plurality of detecting locations, and for each discrete transmission, receiving and retransmitting said transmission at each successive location in said selected number of locations,
   c. upon completing said sequence once, repeating steps (a) and (b) so that during each sequence, a different sample is transmitted;
   d. placing said coded signals in binary word form, and
   e. converting said binary coded signals into quaternary coded signals and an extra signal for differentiating between successive like quaternary coded signals.

4. A method of transmitting seismic data via a radio frequency transmission link from one location to another location along a traverse comprising the following steps:
- at a detecting location, sampling seismic data and producing coded signals from the sample, said coded signals being representative of a number of digit values; and
- from said detecting location transmitting on different radio frequencies coded signals indicative of digits of different values, and
- when two coded signals are indicative of two successive digits of the same value, transmitting the coded signal indicative of the second digit on a different frequency from that on which the coded signal indicative of the first digit was transmitted.

5. The method of claim 4 further including in the step of producing coded signals, the step of producing a binary digital signal and the step of combining binary digits into said coded signal.

6. For use in a seismic surveying system for deriving indications of seismic energy, and for selectively relaying radio transmissions or originating a radio transmission, apparatus comprising:
- radio receiver means for receiving coded radio frequency data signals with no two successive data signals having the same frequency, and for respectively converting each of said data signals into corresponding and discrete time signals;
- radio transmitter means for responding to said discrete time signals for transmitting coded radio frequency data signals, no two successive data signals having the same frequency;
- sampling means for sampling electrical signals representative of seismic energy and for producing successive discrete time signals coded with respect to each sampled signal; and
- selection means for selectively coupling the time signals from either said sampling means or said receiver means to said transmitter means.

7. The apparatus of claim 6 further including in said receiver means, separate electrical channels where each of said channels has a filter means for passing a preselected frequency, said electrical channels corresponding to the number of frequencies in said coded transmission signal, and means in said channels for converting the signals in said channels to discrete time signals.

8. The apparatus of claim 7 further including time spacer means for receiving the outputs of said channels, said time spacer means including pulse forming means for each channel, clocking means, and means in one of said channels for delaying the input signal by one time increment and for conjunctively with said clocking means operating said pulse forming means at pre-established time increment intervals.

9. The apparatus of claim 6 wherein said transmitter means includes:
- a converter for converting said time signals into voltage signals, and
- means responsive to said voltage signals for producing corresponding radio frequency signals.

10. The apparatus of claim 6 and further including a frequency reference loop including:
- first means for receiving said ratio frequency signals and for compensating said radio frequency signals for providing first radio frequency signals at a common frequency base,
- a source of radio frequency signals for providing second ratio frequency signals at said common frequency base, and
- second means for comparing said first and second ratio frequency signals and providing an error output control signal, said error output control signal being supplied to said first means.

11. A seismic surveying system for deriving indications of seismic impulses occurring at locations along a traverse,
- first means for generating control signals at a control station;
- second means for transmitting said control signals from said control station;
- third means for receiving said control signals at each of a plurality of locations located along said traverse;
- fourth means for generating electrical signals at each of said plurality of locations as a function of said seismic impulses;
- fifth means for sampling said electrical signals at each of said plurality of locations and generating distinctively coded signals representative of the values of said sampled electrical signals, including means for converting said electrical signals into binary coded signals and means for converting said binary coded signals into a quaternary coded signal and an extra signal for differentiating between successive like quaternary signals;
- sixth means at each of said locations responsive to the received control signals for originating synchronized discrete transmissions of said coded signals in sequence at a predetermined sequence of locations;
- seventh means at each of said locations for receiving and retransmitting each discrete transmission of said coded signals to relay said coded signals along said traverse to a recording location located on or near said traverse; and
- the first means for generating control signals includes eighth means for generating command signals for selecting said selected number of locations and for generating timing signals to actuate said sixth means for synchronizing and sequencing said selected number of locations.

12. Apparatus for use in a seismic surveying system for producing indications of seismic signals derived at locations along a traverse, comprising:
- radio frequency receiver means for receiving a sequence of coded data signals from a location spaced therefrom on said traverse;
- radio frequency transmitter means;
- control means for producing control signals responsive to radio frequency signals from another location;
- means for producing a sequence of coded digital data signals representative of samples of electrical signals indicative of detected seismic signals,
- selection means responsive to control signals from said control means for selectively coupling said receiver means or said means for producing a sequence of coded data signals to said transmitter means;
- circuit means for producing a sequence of sets of binary digital signals representative of seismic signals;

binary register means for temporarily storing the binary digital signals from said circuit means; and encoder means for encoding each set of binary digital signals from said binary register means.

13. The apparatus of claim 12 wherein the encoder means produces a set of distinctive signals each indicative of a pair of binary digital signals in a set.

14. The apparatus of claim 13 wherein the ratio frequency transmitter means produces output signals of a plurality of different frequencies, each frequency corresponding to similar distinctive signals in the sets of distinctive signals produced by said encoder means.

15. The apparatus of claim 12 wherein the encoder means includes first means for converting the digital signals into quaternary coded signals, and second means for producing an extra signal and inhibiting production of a quaternary coded signal whenever two successive quaternary coded signals of the same value would be produced, and further wherein the transmitter means includes means for changing the frequency of signals produced by said transmitter means to values related to the output signals of said encoder means.

16. For use in a seismic surveying system for deriving indications of seismic energy, apparatus comprising:

radio frequency receiver means for receiving coded signals which include seismic data signals successively occurring at regular time intervals with no two successive data signals having the same frequency;

first means for separating the frequency components of said coded signals and applying the resulting signals on separate signal channels;

second means for converting the signals in said channels into discrete time signals and for delaying said discrete time signals by a predetermined time interval; and third means including radio frequency transmitter means connected to said second means for producing radio frequency signals of different frequencies dependent on the channel from which a delayed time signal is received thereby such that the signal is of the same frequency as the radio frequency signal applied to the channel.

17. The apparatus of claim 16 wherein said second means includes pulse forming means for each channel, clocking means, and means for delaying the signal applied to each channel by one time increment of said clocking means and for conjunctively with said clocking means operating said pulse forming means at pre-established time increment values.

18. The apparatus of claim 16 wherein the third means includes a converter for converting said time signals into voltage signals, and means responsive to said voltage signals for varying the frequency of said radio frequency transmitter means.

19. Apparatus for producing radio frequency signals indicative of seismic signals comprising:

radio frequency transmitter means;

first means for producing binary digital signals indicative of said seismic signals, including a register for reciving said binary digital data signals in parallel and means for producing two serial binary digital data streams of information for encoding;

second means for encoding said binary ditial signals according to a multidigit code wherein each digit of the code represents a distinctive pair of binary digits from said first means; and third means for varying the frequency of said transmitter means between a plurality of frequencies in accordance with the encoded output signals of said second means..

20. The apparatus of claim 19 wherein said first means further includes:

binary gain amplifier means the gain of which is varied in accordance with a schedule of powers of two and which includes means for producing first binary digital signals indicative of said gain at any time;

means for producing second binary digital signals indicative of the amplified signals of said amplifier at time spaced intervals; and means for concomitantly loading said first and second binary digital signals into said register.

21. In a method of seismic prospecting wherein a seismic disturbance is generated at a generating location and the resulting seismic energy is detected at a pluarlity of seismic detecting locations spaced along a traverse of the earth the improvement which comprises:

generating at each detecting location digitally encoded signals which are representative of the seismic energy detected at such detecting location, radio transmitting the digitally encoded signals from each of said detecting locations in sequence along said traverse toward one end thereof, separating the radio transmissions from successive detecting locations by time intervals, during any given time interval radio relaying toward one end of said traverse the radio signals transmitted immediately prior to each such time interval from their respective detecting location to successive ones of said detecting locations located between said respective detecting location and said one end of said traverse;

the radio transmissions being made on $n + 1$ different frequencies where $n$ is the number of different digits in the digital code, the transmission of each digit value in said code being transmitted on a particular one of said $n$ frequencies except when the same digit value occurs twice in succession whereupon the second occurrence of said digital value is transmitted on the $n + 1$ frequency.

22. A method as defined in claim 21 in which the digital code is binary and the radio transmissions are on three frequencies.

23. A method as defined in claim 21 in which the digital code is quaternary and the radio transmissions are on five frequencies.

24. Apparatus for detecting seismic energy in the earth which comprises:

transducer means to generate an electrical signal which is representative of said seismic energy;

means to sample said electrical signal;

means to encode said sample signal in a digital code having $n$ digit values where $n$ is a whole even number greater than one;

radio transmission means to transmit said digitally encoded sample signal as a radio transmission wherein each digit having a given one of said digit values is transmitted for an interval of time on a selected one of $n$ different frequencies, except where said transmission has been immediately preceded by a transmission on the same said selected frequency whereupon said transmission means transmits said digit on an additional frequency distinct from said *n* frequencies;

radio receiver means adapted to receive radio tranmissions of the type transmitted by said transmission means; and control means adapted to actuate said transmission means in response to either the transmissions received by said radio receiver means or the sample signals produced by said digital encoding means.

25. Apparatus as defined in claim 24 including second radio receiver means adapted to receive radio transmissions for actuating said control means.

26. Apparatus as defined in claim 24 wherein a single additional frequency serves as the additional frequency for each of said digital values.

27. Apparatus as defined in claim 24 wherein *n* has a value of 2, and the digitally encoded sample signal transmitted by said transmission means is encoded in a binary code.

28. Apparatus as defined in claim 24 wherein *n* has a value of 4, and the digitally encoded sample signal transmitted by said transmission means is encoded in a quaternary or four level digital code.

29. Apparatus as defined in claim 24 wherein *n* has a value of 8, and the digitally encoded sample signal transmitted by said transmission means is encoded in an octal code.

30. Apparatus for detecting seismic energy in the earth which comprises:

transducer means to generate an electrical signal which is representative of said seismic energy;

means to sample said electrical signal;

means to encode said sample signal in a digital code having *n* digit values where *n* is a whole even number greater than one;

signal transmission means to transmit said digitally encoded sample signal as a transmission wherein each digit having a given one of said digit values is transmitted for an interval of time on a selected one of *n* different frequencies, except where said transmission has been immediately preceded by a transmission on the same said selected frequency whereupon said transmission means transmits said digit on an additional frequency distinct from said *n* frequencies;

receiver means adapted to receive transmissions of the type transmitted by said transmission means; and control means adapted to actuate said transmission means in response to either the transmissions received by said receiver means of the sample signals produced by said digital encoding means.

* * * * *